United States Patent
McCarty et al.

(10) Patent No.: US 10,531,239 B1
(45) Date of Patent: Jan. 7, 2020

(54) SYSTEMS AND METHODS FOR TEMPORARILY LICENSING CONTENT

(71) Applicant: Rovi Guides, Inc., San Jose, CA (US)

(72) Inventors: Michael McCarty, Agoura Hills, CA (US); Glen E. Roe, Simi Valley, CA (US)

(73) Assignee: ROVI GUIDES, INC., San Jose, CA (US)

(*) Notice: Subject to any disclaimer, the term of this patent is extended or adjusted under 35 U.S.C. 154(b) by 0 days.

(21) Appl. No.: 16/138,143

(22) Filed: Sep. 21, 2018

(51) Int. Cl.
  *H04W 4/029* (2018.01)
  *H04W 4/024* (2018.01)
  *H04W 4/021* (2018.01)

(52) U.S. Cl.
  CPC ............ *H04W 4/029* (2018.02); *H04W 4/021* (2013.01); *H04W 4/024* (2018.02)

(58) Field of Classification Search
  CPC ...... H04W 4/029; H04W 4/024; H04W 4/021
  See application file for complete search history.

(56) References Cited

U.S. PATENT DOCUMENTS

| | | | | |
|---|---|---|---|---|
| 9,436,805 | B1* | 9/2016 | Kravets | G06F 21/10 |
| 2006/0059096 | A1* | 3/2006 | Dublish | G06F 21/10 705/57 |
| 2006/0206610 | A1* | 9/2006 | Ling | H04L 67/26 709/226 |
| 2007/0027809 | A1* | 2/2007 | Alve | H04L 63/08 705/51 |
| 2008/0201747 | A1* | 8/2008 | Cooper | G06F 21/10 725/93 |
| 2009/0298514 | A1* | 12/2009 | Ullah | G01S 5/02 455/456.5 |
| 2011/0055859 | A1* | 3/2011 | Dasher | G06F 21/10 725/1 |
| 2012/0216289 | A1* | 8/2012 | Kawaguchi | G06F 21/10 726/26 |
| 2013/0347025 | A1* | 12/2013 | Prakash | H04N 21/2541 725/25 |
| 2014/0006951 | A1* | 1/2014 | Hunter | H04H 60/31 715/719 |
| 2014/0304784 | A1* | 10/2014 | Harrison | H04L 63/0492 726/5 |
| 2016/0308958 | A1* | 10/2016 | Navali | H04N 21/2662 |

* cited by examiner

*Primary Examiner* — Minjung Kim
(74) *Attorney, Agent, or Firm* — Haley Guiliano LLP

(57) ABSTRACT

Systems and methods are described herein for providing content for consumption on a mobile device by temporarily licensing the content to the mobile device while the mobile device is travelling between two locations having media devices licensed to provide the content for consumption, or while temporarily outside a location having a media device licensed to provide the content for consumption. Upon detecting that the mobile device is leaving a location at which the content is being provided it is determined whether the mobile device is within a threshold distance of the location, or if the content is licensed to be provided for consumption by a media device at an identified destination. The content is temporarily licensed for consumption on the mobile device to allow the mobile device to provide the content for consumption while outside the first location or while travelling to the second location.

20 Claims, 14 Drawing Sheets

SYSTEMS AND METHODS FOR TEMPORARILY LICENSING CONTENT

BACKGROUND

The present disclosure relates to content delivery and consumption systems and, more particularly, to providing a license to consume content on a mobile device.

SUMMARY

There are many venues that provide content for consumption by patrons, fans, and guests. Should such consumers leave the venue before the content is over, such as to go to another venue or simply to take a break, they may miss some of the content. Many mobile devices that a user may carry are capable of outputting content (e.g., videos, audio, etc.) for consumption by the user and could be used while away from the venue and/or in transit to another venue. In some cases, however, content desired by a user may not be licensed for consumption on the user's mobile device. For example, a user may begin consuming content at a first location, such as a concert, arena, bar or restaurant. Upon leaving the first location, the user may want to continue consuming the content until returning to the first location or arriving somewhere else the content is licensed for consumption.

Systems and methods are described herein for temporarily licensing content for consumption on a mobile device while the mobile device either travels or returns to a location where the content is licensed for consumption on a media device. Upon detecting that the mobile device is leaving a first location at which the content is being consumed, the destination of the mobile device and/or the proximity of the mobile device to the first location, and the content, are identified. As described below, whether the content is licensed to be consumed on a media device at the destination is determined and, if it is, the content is temporarily licensed for consumption on the mobile device while travelling between the two locations. As also described below, whether the user leaves the venue but stays within a threshold distance of the venue is determined and, for as long as the user remains within the threshold distance, the content is temporarily licensed for consumption on the mobile device until the user returns to the venue. This allows the user to continue consuming the content without missing any portion of the content. The location of the mobile device is monitored. After the mobile device arrives at the second location or returns to the first location, the temporary license ends. This may occur based solely the arrival of the mobile device at the destination or based on other conditions as discussed below.

The mobile device identifies the content being consumed at the current location using any suitable approach, including one or more of the approaches described below. For example, the mobile device may query a media device consuming the content. Alternatively, the mobile device may capture an audio and/or video sample of the content and compare the sample to a database of samples. As another alternative, the mobile device may query a server associated with the media device to determine what content is being provided to the media device by the server.

The mobile device determines its destination or proximity to a location using any suitable approach, including one or more of the approaches described below. For example, a user may input a destination in a navigation application (e.g., Google Maps) or use a geolocation system. The mobile device may capture the input, or may extract the input destination after the user has completed the input. Similarly, the user may input a request for car from a ride-hailing service application (e.g., Uber) which includes a destination. Again, the mobile device may capture the input, or may extract the input destination after the user has completed the request. Additionally, the mobile device may extract a location from an appointment in a calendar application. The media device then reports the destination to the server.

To obtain the temporary license, the mobile device transmits the identification of the content and the destination of the mobile device to a server. The server then determines whether the content is licensed for consumption on a media device at the destination. For example, the server queries a database based on the destination, or based on the identified content, to determine whether the content has been licensed to a media device at the destination.

In response to determining that the content is licensed for consumption at the destination, the server grants a temporary license for the content to the mobile device. Thus, if the user begins consuming the content at the first location, and travels to a second location that is also licensed to provide the content, the user may continue to consume the content while travelling to the destination.

In some embodiments, the server receives, from the mobile device, an updated location of the mobile device. For example, the mobile device may periodically obtain its position from a location service or built-in GPS system. The mobile device may report its current position to the server at regular intervals, which may be each time an updated position is obtained, or at an independently controlled interval (e.g., every five minutes). The server determines, based on the updated location, whether the mobile device has reached the destination. For example, the server may compare the updated location with location data corresponding to the destination. In response to determining that the mobile device has reached the destination, the server revokes the temporary license. Thus, since the user did not obtain a license for the content to be provided in full on the mobile device (e.g., by purchasing pay-per-view content), the user is permitted to consume the content on the mobile device only until the user reaches the destination.

In response to determining that the mobile device has reached the destination, it may be determined whether the content is currently being consumed on a media device at the destination. For example, the server polls media devices at the destination to determine what content is being consumed on each media device. Alternatively, the mobile device identifies content being consumed on media devices at the destination, using any of the methods described above for identifying content. If the content is currently being consumed on a media device at the destination while the mobile device is there, the server revokes the temporary license. If the content is not currently being consumed on any media device at the destination, the server will allow the temporary license to continue. Periodically, the server determines whether the content is being consumed on any media device at the destination and revokes the temporary license only once it is determined that the content is being consumed. Thus, the user can continue to consume the content on the mobile device until he or she is able to continue consuming the content on a media device at the destination.

The temporary license may end or expire based on a period of time calculated to allow the mobile device to arrive at the destination. This may be in addition to, or as an alternative to, determining that the mobile device has actually arrived at the location. For example, the server may predict an amount of time needed for the mobile device to reach the destination from the current location. This may be accomplished by calculating a distance between the current location and the destination and multiplying the distance by a preset average speed. Alternatively, the server may access a navigation database to determine an average speed limit of a route between the current location and the destination, and may access a traffic database to determine if any traffic will impact the time required to reach the destination. Alternatively, the mobile device may calculate the time required to reach the destination in a similar manner or may retrieve a time required from an application in which the destination was inputted, and report the time required to the server. The server then starts a timer and periodically determines whether the predicted amount of time has passed. Once the predicted amount of time has passed, the server revokes the temporary license.

The server may determine whether the content is licensed to an account associated with the mobile device. For example, the server may determine if the user purchased a license for the content to be consumed on a media device in his or her home. If the content is licensed to an account associated with the mobile device, the server may present an option on the mobile device to begin recording the content. For example, the server may transmit a push notification or other message to the mobile device offering options to record the content to the user's DVR or other media recording device. If the user selects to record the content, the mobile device transmits a request to the server to begin recording. The server buffers the content from at least the time at which the request was received and stores the buffered content in a memory of the server, or a cloud storage system. Alternatively, the server instructs a DVR or other media recording device associated with the user's account to begin recording the content.

The server may begin recording the content in response to determining that the mobile device is en route to the destination. For example, while monitoring the location of the mobile device, the server compares the current location of the mobile device with the first location and the destination location and determines that the mobile device is located in an area between the first location and the destination location. The server then records the content from at least a time at which the mobile device was determined to be en route to the destination. As above, the server may store a buffered portion of the content in a memory of the server or at a cloud storage system, or may instruct a media recording device associated with the user's account to begin recording the content.

After the temporary license is granted, the content is provided to the mobile device for output. In some embodiments, the server identifies a content stream corresponding to the content. For example, the server may access a content database and retrieve a URL or other identifier or resource locator corresponding to the content stream. The server transmits a copy of the content stream corresponding to the content to the mobile device beginning from a current live playback point. For example, the server may access the URL of the stream and relay the streaming data in real time or near-real time to the mobile device. Alternatively, the server identifies a content provider of the content stream. For example, the server may retrieve from the content database an identifier of the content provider. The server transmits a request for a new stream connection to the content provider and creates a stream connection between the content provider and the mobile device. For example, the server opens a connection to the mobile device to transmit the stream and a connection to the service provider to receive the stream. The server may bridge the two connections to establish a connection from the mobile device to the content provider to allow the mobile device to receive the content.

In some embodiments, where the destination is received from a ride-hailing service, the server may determine whether the vehicle assigned to transport the user from the starting location to the destination has a media device on board. For example, the server may access a database of the ride-hailing service to identify the vehicle assigned to transport the user, and to identify features of the vehicle, including the presence of a media device. If the vehicle has a media device on board, the server grants a temporary license to provide the content for consumption to the media device of the vehicle. This allows the user to continue consuming the content while travelling and have a better media experience compared to that of a mobile device.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
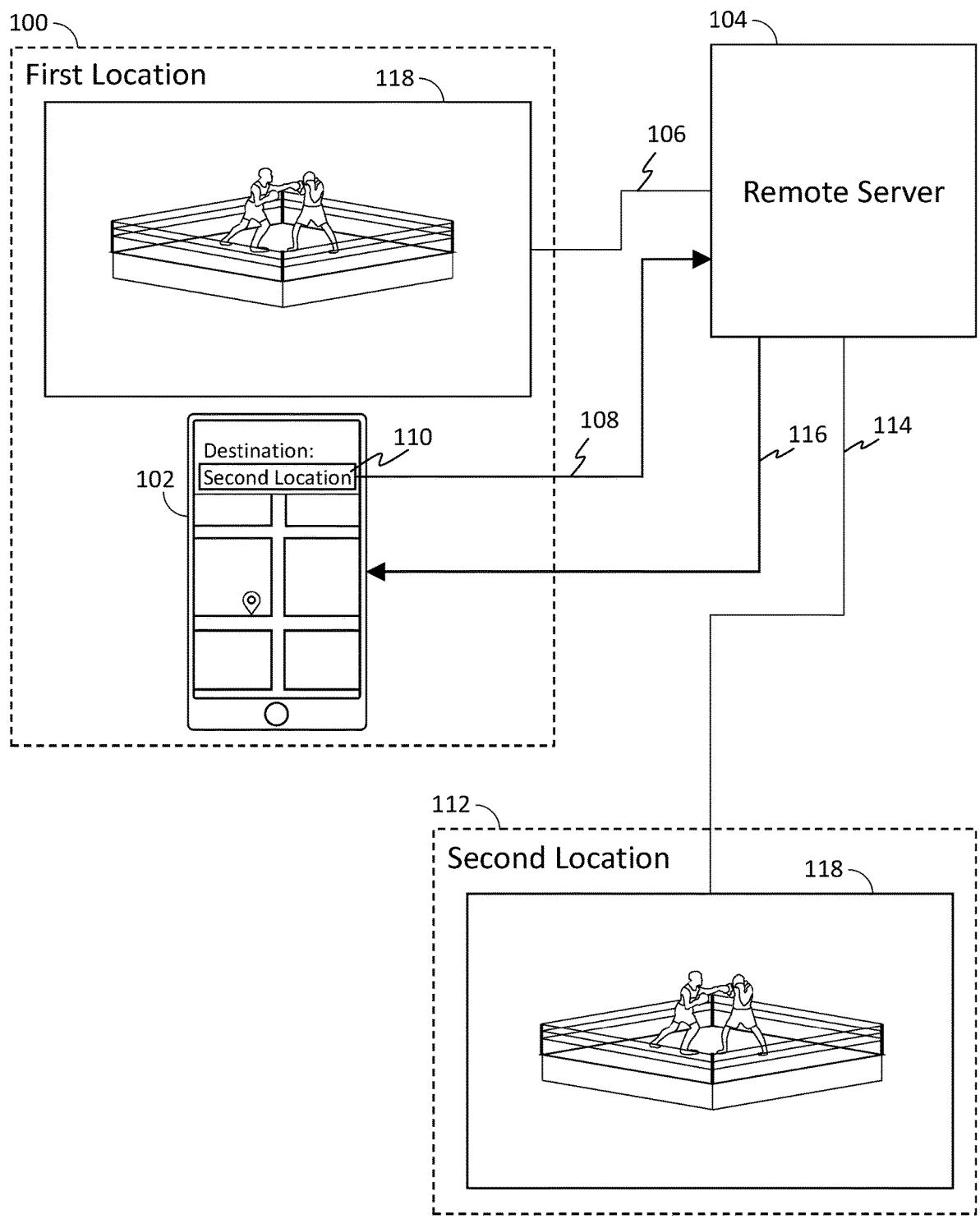
FIG. 1 shows a generalized embodiment of a destination on a mobile device at a first location triggering provision and grant of a temporary license to the mobile device in accordance with some embodiments of the disclosure.

FIG. 1 is a generalized embodiment of input of a destination on a mobile device at a first location triggering provision and grant of a temporary license to the mobile device in accordance with some embodiments of the disclosure. While at the first location 100, the user begins watching content 118, which is being consumed on a media device at the first location 100. For example, the user goes to a sports bar. While at the sports bar, a pay-per-view event, such as a boxing match, may begin. The sports bar purchased a license for the boxing match and is therefore able to provide the boxing match for output to be watched by customers at the sports bar. After viewing part of the boxing match, the user wishes to leave the sports bar for another location, such as second location 112. The user inputs the destination 110 corresponding to second location 112 into his or her mobile device 102. The mobile device 102 may be a smartphone, tablet PC, of any other personal electronic device capable of receiving wireless transmissions such as WiFi (IEEE 802.11a/b/g/n), WiMAX, GSM, UTMS, CDMA, TDMA, 3G, 4G, 4G LTE, or any other suitable type of wireless data transmission. The mobile device 102 identifies the boxing match 118 as being output by a media device at the sports bar 100, and sends 108 an identifier of the boxing match 118, as well as the user's destination 110, to a server 104. The server 104 determines if a license for the boxing match 118 has been purchased at second location 112 corresponding to destination 110. If so, the server 104 temporarily licenses 116 the boxing match 118 to the user's mobile device 102. The user can then continue watching the boxing match 118 while travelling between the sports bar 100 and the second location 112.

Figure 2:
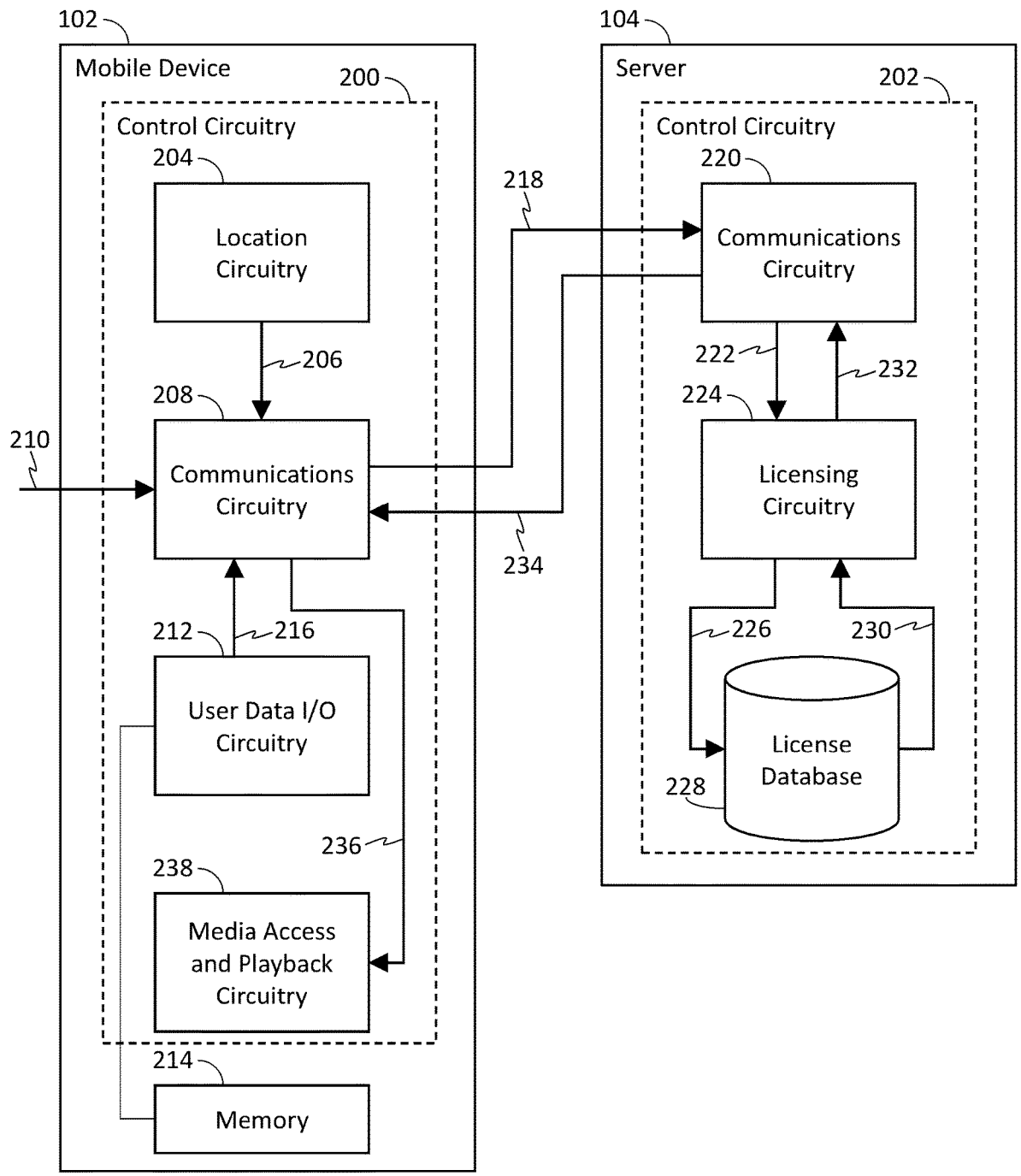
FIG. 2 is a block diagram representing information transfer between a mobile device and a server in accordance with some embodiments of the disclosure.

FIG. 2 is a block diagram representing information transfer between a mobile device and a server in accordance with some embodiments of the disclosure. Mobile device 102 includes control circuitry 200. Mobile device control circuitry 200 may be based on any suitable processing circuitry, and comprises control circuits and memory circuits which may be disposed on a single integrated circuit, or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software.

Mobile device control circuitry 200 includes location circuitry 204. Location circuitry 204 may comprise a global position system (GPS) receiver, cell tower identifier, WiFi signal strength measuring circuitry, inertial sensors, environmental sensors, a terrestrial broadcast receiver, or any other suitable circuitry or component for determining a geographic location. Upon determining a geographic location, location circuitry 204 transfers 206 the location information to mobile device communications circuitry 208. Mobile device communications circuitry 208 contains circuitry for transmitting and receiving wireless transmissions such as those listed above, as well as Bluetooth, near-field communication (NFC), and other short-range wireless protocols. Mobile device communications circuitry 208 also receives 210, from a media device at a current location of the mobile device 102, an identifier of content currently being output by the media device. Communications circuitry 208 may receive the identifier from the media device in response to transmitting a request to the media device for the identifier of the content.

Mobile device control circuitry 200 also includes user data input/output circuitry 212, which is configured to receive input from a user input device, such as a keyboard or touchscreen interface, microphone, camera, or other input device. User data input/output circuitry 212 is also configured to access and retrieve user data stored on the mobile device 200, such as in memory 214. Memory 214 may be any suitable electronics storage device or medium, such as a hard disk, floppy disk, USB drive, DVD, CD, media cards, register memory, processor caches, or Random Access Memory (RAM). User data input/output circuitry 212 may receive an indication of a destination of the mobile device 102. For example, the user may input a destination into an application of the mobile device 102. Alternatively, a user may have recorded an address of an upcoming appointment or meeting in a calendar application, which user data input/output circuitry 212 may retrieve from memory 214. User data input/output circuitry 212 may transfer the destination location to communications circuitry 208. Mobile device communications circuitry 208 in turn transmits 218 the current location received 206 from location circuitry 204, the indicator of content being consumed at the current location received 210 from a media device, and the destination location received 216 from user data input/output circuitry 212 to server 104.

Server 104 includes control circuitry 202. Like mobile device control circuitry 200, server control circuitry 202 may be based on any suitable processing circuitry and comprises control circuits and memory circuits which may be disposed on a single integrated circuit, or may be discrete components. Server control circuitry 202 includes communications circuitry 220. Server communications circuitry 220 contains circuitry for transmitting and receiving wireless transmissions such as those listed above, as well as wired connections such as ethernet, telephone, DSL, fiber optics, and the like. Server communications circuitry 220 receives the current location, identifier of content, and destination location from the mobile device communications circuitry 208. Server communications circuitry 220 transfers 222 the destination location and content identifier to licensing circuitry 224. Licensing circuitry 224 is configured to determine whether content is licensed for consumption at a given location or on a device associated with a given account, and to grant and revoke such licenses. Licensing circuitry 224 queries 226 a license database 228 to determine if the content is licensed for consumption at the destination. Licensing circuitry 224 receives 230 a response from the license database 228. If the response indicates that the content is licensed for consumption at the destination, licensing circuitry 224 generates a temporary license for the content to be consumed on the mobile device 102. Licensing circuitry 224 transfers 232 to server communications circuitry 220 an indication that the content has been licensed for consumption on the mobile device 102. Server communications circuitry 220 transmits 234 the indication to mobile device 102, where it is received by mobile device communications circuitry 208. In response to receiving the indication of the license, mobile device communications circuitry 208 transfers 236 the indication of the license to media access and playback circuitry 238. Media access and playback circuitry 238 is configured to retrieve media data, either directly, or via mobile device communications circuitry 208, and provide such media data for consumption. In response to receiving the indication of the license, media access and playback circuitry 238 may access the content and begin to generate the content for consumption. Alternatively, the media access and playback circuitry 238 generates for display a notification that the content is available for consumption.

In some embodiments, the temporary license ends when the mobile device 102 reaches the destination 110. The server 104 monitors the location of mobile device 102 as described above. For example, the mobile device may, using location circuitry 204, periodically obtain its position using any of the methods described above. The mobile device 102 may report its current position to the server 104 at regular intervals, which may be each time an updated position is obtained, or at an independently controlled interval (e.g., every five minutes). The server 104, using control circuitry 202, determines, based on the updated location, whether the mobile device 102 has reached the destination 110. For example, the server 104 may compare the updated location with location data corresponding to the destination 110. In response to determining that the mobile device 102 has reached the destination 110, the server 104, using licensing circuitry 224, revokes the temporary license. The revocation of the temporary license may be transmitted directly to the mobile device 102 using server communications circuitry 220. Alternatively, mobile device 102 may be prevented from receiving further media data corresponding to the content after the temporary license has been revoked.

In some embodiments, the temporary license ends when the mobile device 102 reaches the destination 110 and the content is currently being consumed on a media device at the destination 110. In response to determining that the mobile device 102 has reached the destination 110, the server 104 determines whether the content is currently being consumed on a media device at the destination 110. For example, the server 104, using server communications circuitry 220, or the mobile device 102, using communications circuitry 208, polls media devices at the destination 110 to determine what content is being consumed on each media device. The server 104 may determine that any, all, or none of the media devices at the destination 110 are currently consuming the content, despite being licensed to do so. Alternatively, the mobile device 102 may poll the media devices at the destination 110. If the content is currently being consumed on a media device at the destination 110, the server 104, using licensing circuitry 224, revokes the temporary license. However, if the content is not currently being consumed on any media device at the destination 110, the server 104, using control circuitry 202, or the mobile device 102, using control circuitry 200, periodically determines whether the content is being consumed on any media device at the destination 110 and only revokes the temporary license once it is determined that the content is being consumed.

In some embodiments, the temporary license is valid only for an amount of time determined by the server 104 as required to reach the destination 110 once the mobile device 102 leaves the first location 100. The server 104, using control circuitry 202, predicts an amount of time needed to reach the destination 110 from the current location of the mobile device 102. For example, the server 104 may calculate, using control circuitry 202, a distance between the current location and the destination 110. The server 104 may also access a navigation database, using control circuitry 202, to determine an average speed limit of a route between the current location and the destination 110. Additionally, the server 104 may access a traffic database, using control circuitry 202, to determine if any traffic will impact the time required to reach the destination 110. The server 104 then starts a timer and periodically determines, using control circuitry 202, whether the predicted amount of time has passed. Once the predicted amount of time has passed, the server 104, using licensing circuitry 224, revokes the temporary license.

In some embodiments, the server 104 determines whether the content has been licensed for consumption to an account associated with the mobile device 102. For example, the server 104 may determine if the user purchased a license for the content to be consumed on a media device in his or her home. If the content is licensed for consumption on an account associated with the mobile device, the server 104 transmits, using server communications circuitry 220, a notification to the mobile device 102 with options to record at least the portion of the content being broadcast while the temporary license is granted. For example, the server 104 may transmit a push notification or other message to the mobile device 102 offering options to record the content to the user's DVR or other media recording device. If the user selects a recording option, the mobile device 102 transmits, using mobile device communications circuitry 208, a request to record the content. The server 104 receives the request from the mobile device 102 using server communications circuitry 220. In response to receiving the request, the server 104 records the content from at least a time at which the request was received. For example, the server 104 may store a portion of the content in a memory of the server 104, or a cloud storage system. Alternatively, the server 104 may instruct a DVR or other media recording device associated with the user's account to begin recording the content.

In some embodiments, while monitoring the location of the mobile device 102, the server 104 determines, based on an updated location received from the mobile device 102, that the mobile device 102 is en route to the destination 110. For example, the server may compare the updated location with the first location 100 and the destination location 110 associated with the second location 112 and determine that the mobile device 102 is located in an area between the first location 100 and the destination location 110. In response to determining that the mobile device 102 is en route to the destination 110, the server 104 records the content from at least a time at which the updated location was received. As above, the server 104 may store a portion of the content in a memory of the server or at a cloud storage system or may instruct a media recording device associated with the user's account to begin recording the content.

In some embodiments, the server 104 identifies a content stream corresponding to the content. For example, the server 104 may access a content database and retrieve a URL or other identifier or resource locator corresponding to the content stream. The server 104 transmits, using server communications circuitry 220, a copy of the content stream corresponding to the content to the mobile device beginning from a current live playback point. For example, the server may access the URL of the stream and relay the streaming data in real time or near-real time to the mobile device. The server 104 may temporarily buffer at least a portion of the streaming data before transmitting it to the mobile device 102.

In some embodiments, the server 104 identifies a content provider of the content stream. For example, the server 104 may retrieve from the content database an identifier of the content provider. The server 104 transmits, using server communications circuitry 220, a request for a new stream connection to the content provider and creates a stream connection between the content provider and the mobile device 102. For example, the server 104 opens a connection to the mobile device 102 to transmit the stream and a connection to the service provider to receive the stream. Server communications circuitry 220 may be configured to bridge the two connections to establish a connection from the mobile device 102 to the content provider to allow the mobile device 102 to receive the content.

In some embodiments, where the destination location 110 is received from a ride-hailing service, the mobile device 102 may also transmit 218 an identifier of the ride-hailing service (e.g., Uber). The server 104 may determine whether the vehicle assigned by the ride-hailing service to transport the user from the first location 100 to the destination 110 has a media device on board. For example, the server 104 may transmit a query to, or directly access, using server communications circuitry 220, a database of the ride-hailing service to identify the vehicle assigned to transport the user, and to identify features of the vehicle, including the presence of a media device. If the vehicle has a media device on board, the server 104 temporarily licenses the content for consumption on the media device of the vehicle.

Figure 3:
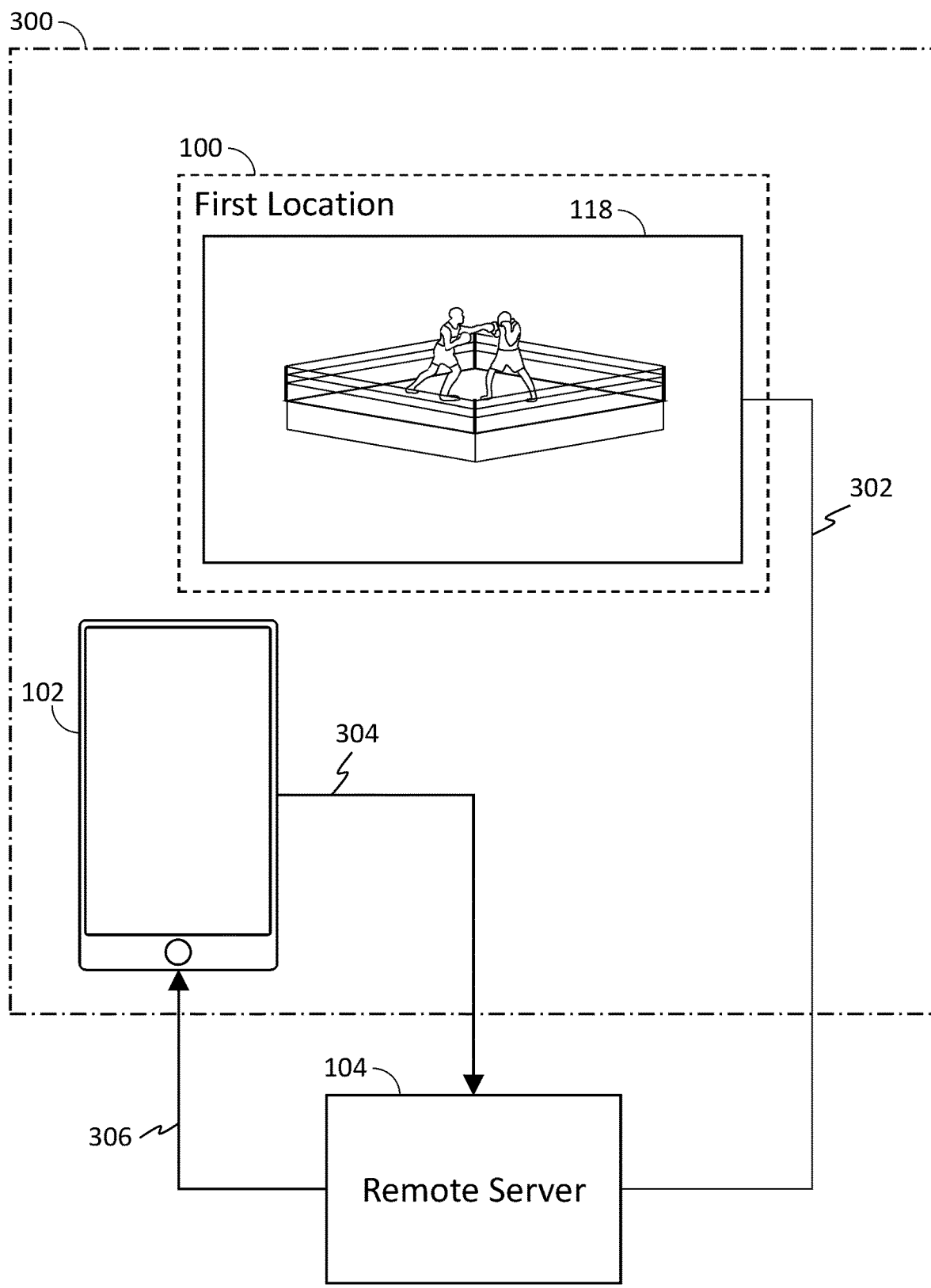
FIG. 3 shows a generalized embodiment of a mobile device outside of a first location and within a threshold distance of the first location triggering provision and grant of a temporary license to the mobile device in accordance with some embodiments of the disclosure.

FIG. 3 shows a generalized embodiment of a mobile device remaining within a threshold distance of a first location triggering provision and grant of a temporary license for content being consumed at the first location. While at the first location 100, the user begins watching content 118 which is being consumed on a media device at the first location 100. For example, the user goes to a sports bar. While at the sports bar, a pay-per-view event, such as a boxing match, may begin. The sports bar purchased a license for the boxing match and is therefore able to provide the boxing match for output to be watched by customers at the sports bar. After viewing part of the boxing match, the user needs to leave the sports bar temporarily. For example, the user may need to go outside the sports bar to meet a friend passing by. The mobile device 102 reports 304 its location to the server 104. Server 104 identifies 302 the boxing match as content being consumed at the first location 100 and temporarily licenses the boxing match to the mobile device 102. Server 104 continues to receive 304 updated location information from the mobile device 102 and determines, based on the reported location of the mobile device 102, if the mobile device 102 is within an area 300 defined by a threshold distance from the first location 100, such as a 50-foot radius from the first location 100. If the mobile device 102 moves outside of area 300, or goes back inside the first location 100, server 104 revokes the temporary license.

Figure 4:
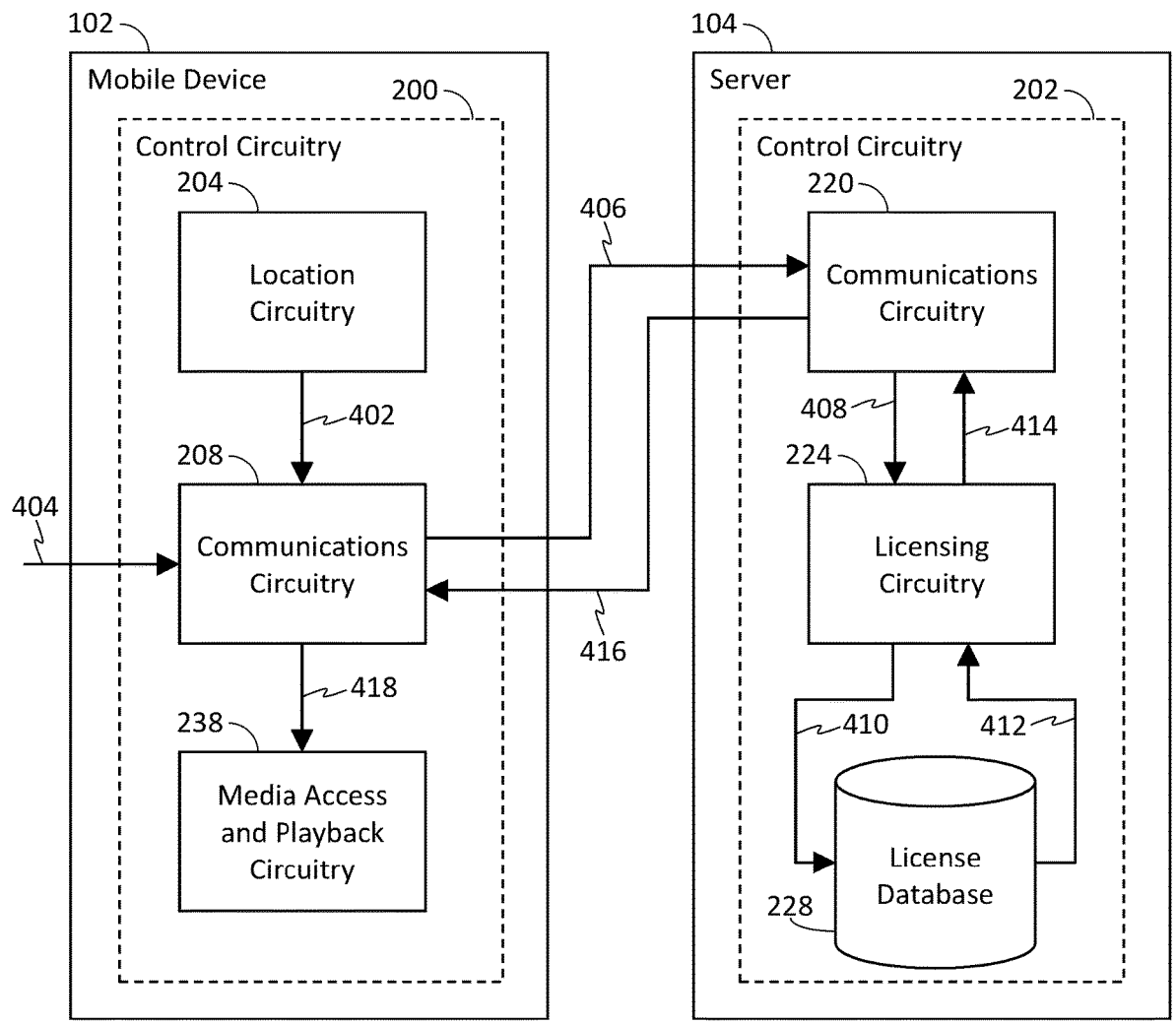
FIG. 4 is another block diagram representing information transfer between a mobile device and a server in accordance with some embodiments of the disclosure.

FIG. 4 is another block diagram representing information transfer between a mobile device and a server in accordance with some embodiments of the disclosure. Location circuitry 204 obtains a current location of the mobile device 102, and transfers 402 the location information to mobile device communications circuitry 208. Mobile device communications circuitry 208 also receives 410, from a media device at the current location of the mobile device 102, an identifier of content currently being output by the media device. Communications circuitry 208 may receive the identifier from the media device in response to transmitting a request to the media device for the identifier of the content. Mobile device communications circuitry 208 transmits the current location and the identifier of the content to server 104.

Server 104, using server communications circuitry 220, receives the location information and content identifier from the mobile device 102. Server communications circuitry 220 transfers 408 the location information and content identifier to licensing circuitry 224. Licensing circuitry 224 determines, based on the location information and the content identifier, location information for the first location 100. Licensing circuitry determines the first location 110 by querying 410 license database 228 to identify a location within a threshold distance from the mobile device 102 at which the identified content is licensed for consumption. If licensing circuitry 224 determines, based on response 412 from license database 228, that the mobile device 102 is within the threshold distance of the first location, licensing circuitry 224 generates a temporary license for the content to be consumed on the mobile device 102. Licensing circuitry transfers 414 to server communications circuitry 220 an indication that the content has been licensed for consumption on the mobile device 102. Server communications circuitry 220 transmits 416 the indication to mobile device 102, where it is received by mobile device communications circuitry 208. In response to receiving the indication of the license, mobile device communications circuitry 208 transfers 418 the indication of the license to media access and playback circuitry 238. Media access and playback circuitry 238 accesses, based on the indication of the license, the identified content and generates the identified content for consumption. Alternatively, the media access and playback circuitry 238 generates for display a notification that the content is available for consumption.

In some embodiments, the temporary license ends when the mobile device 102 returns to the first location 100. The server 104 monitors the location of mobile device 102 as described above. For example, the mobile device may, using location circuitry 204, periodically obtain its position using any of the methods described above. The mobile device 102 may report its current position to the server 104 at regular intervals, which may be each time an updated position is obtained, or at an independently controlled interval (e.g., every five minutes). The server 104, using control circuitry 202, determines, based on the updated location, whether the mobile device 102 has returned to the first location 100. For example, the server 104 may compare the updated location with location data corresponding to the first location 100. In response to determining that the mobile device 102 has reached the first location 100, the server 104, using licensing circuitry 224, revokes the temporary license. The revocation of the temporary license may be transmitted directly to the mobile device 102 using server communications circuitry 220. Alternatively, mobile device 102 may be prevented from receiving further media data corresponding to the content after the temporary license has been revoked.

Figure 5:
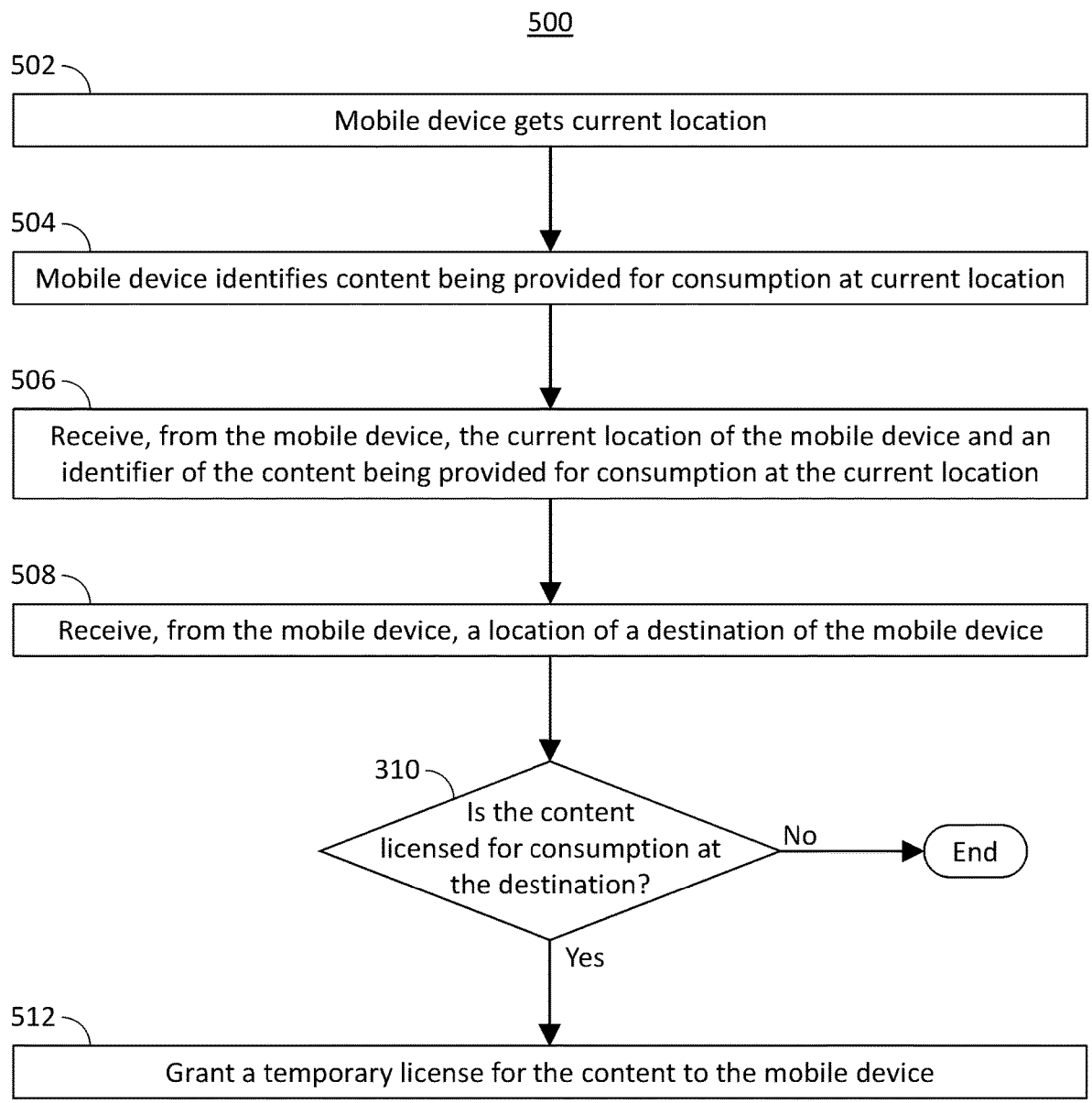
FIG. 5 is a flowchart representing a process for granting a temporary license to a mobile device in accordance with some embodiments of the disclosure.

FIG. 5 is a flowchart representing a process for granting a temporary license to a mobile device in accordance with some embodiments of the disclosure. The flowchart in FIG. 5 represents a process 500 implemented on mobile device control circuitry 200 and/or server control circuitry 202 for granting a temporary license to a mobile device according to an embodiment of the disclosure. In addition, one or more actions of process 500 may be incorporated into or combined with one or more actions of any other process or embodiment described herein. Furthermore, process 500 may be performed exclusively on the mobile device 102, exclusively on the server 104, or be distributed between both mobile device 102 and server 104.

At 502, mobile device control circuitry 200 obtains a current location. For example, mobile device control circuitry 200, using location circuitry 204, retrieves location data corresponding to the current geographic location of the mobile device 102. Location circuitry 204 may calculate a geographic location based on GPS satellite data. Alternatively, Location circuitry 204 may retrieve a current location from a terrestrial broadcast station, local WiFi internet connection, or other location service.

At 504, mobile device control circuitry 200 identifies content being consumed on a media device at the current location. For example, the mobile device communications circuitry 208 transmits a query to a media device at the current location. The query may be an HTTP request transmitted over a WiFi network, an Object-exchange (OBEX) request transmitted over a Bluetooth connection, or an NFC request transmitted using Near-Field Communication Interface and Protocol-1 (ISO/IEC 18092) or Near-Field Communication Interface and Protocol-2 (ISO/IEC 21481). Mobile device communications circuitry 208 may receive, in response to the query, an identifier of content being consumed. Alternatively, mobile device control circuitry 200 may include a microphone and/or camera and may capture an audio and/or video sample of the content being output at the current location. The mobile device communications circuitry 208 may transmit the sample as part of a query to a database of media samples in order to identify the content. Mobile device control circuitry 200 may receive, via mobile device communications circuitry 208, a response to the query containing an identifier of the content.

At 506, server control circuitry 202 receives, from the mobile device 102, the current location of the mobile device 102 and an identifier of content being consumed on a media device at the current location. For example, server communications circuitry 220 may receive from the mobile device 102, the location determined by location circuitry 204 and the identifier of the content.

At 508, the server control circuitry 202, using server communications circuitry 220, receives from the mobile device 102 a destination location 110. For example, a user may input a destination in a navigation application (e.g., Google Maps) using a keyboard, touchscreen interface, voice command or other suitable input method. The mobile device may capture the input, or may extract the input destination after the user has completed the input. Similarly, the user may input a request for a car from a ride-hailing service application (e.g., Uber) which includes a destination. Again, the mobile device may capture the input, or may extract the input destination after the user has completed the request. Additionally, the mobile device may extract a location from an appointment in a calendar application. The media device 102 then reports the destination 110 to the server 104 using mobile device communications circuitry 208, which is received by server communications circuitry 220.

At 510, the server control circuitry 202 determines whether the identified content is licensed for consumption at the destination 110. For example, server control circuitry 202, using licensing circuitry 224, may determine whether content is licensed for consumption at a given location or on a device associated with a given account. Licensing circuitry 224 is configured to query a license database 228 to determine if the content is licensed for consumption at the destination. For example, licensing circuitry may use an SQL "SELECT" command to locate any records in the licensing database 228 corresponding to the identified content and associated with the destination 110 or an account associated with the destination 110.

If the content is licensed for consumption at the destination 110, then, at 512, licensing circuitry 224 grants a temporary license for the content to the mobile device 102. For example, licensing circuitry 224 may generate an encryption key or other unique access control code and may update the license database 228 to associate the encryption key or unique access control code with the content. The server 104 may also transmit the encryption key or unique access control code to the mobile device 102, using server communications circuitry 220, thereby licensing the content for output at the mobile device 102.

It is contemplated that the actions or descriptions of FIG. 5 may be used with any other embodiment of this disclosure. In addition, the actions and descriptions described in relation to FIG. 5 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process.

Figure 6:
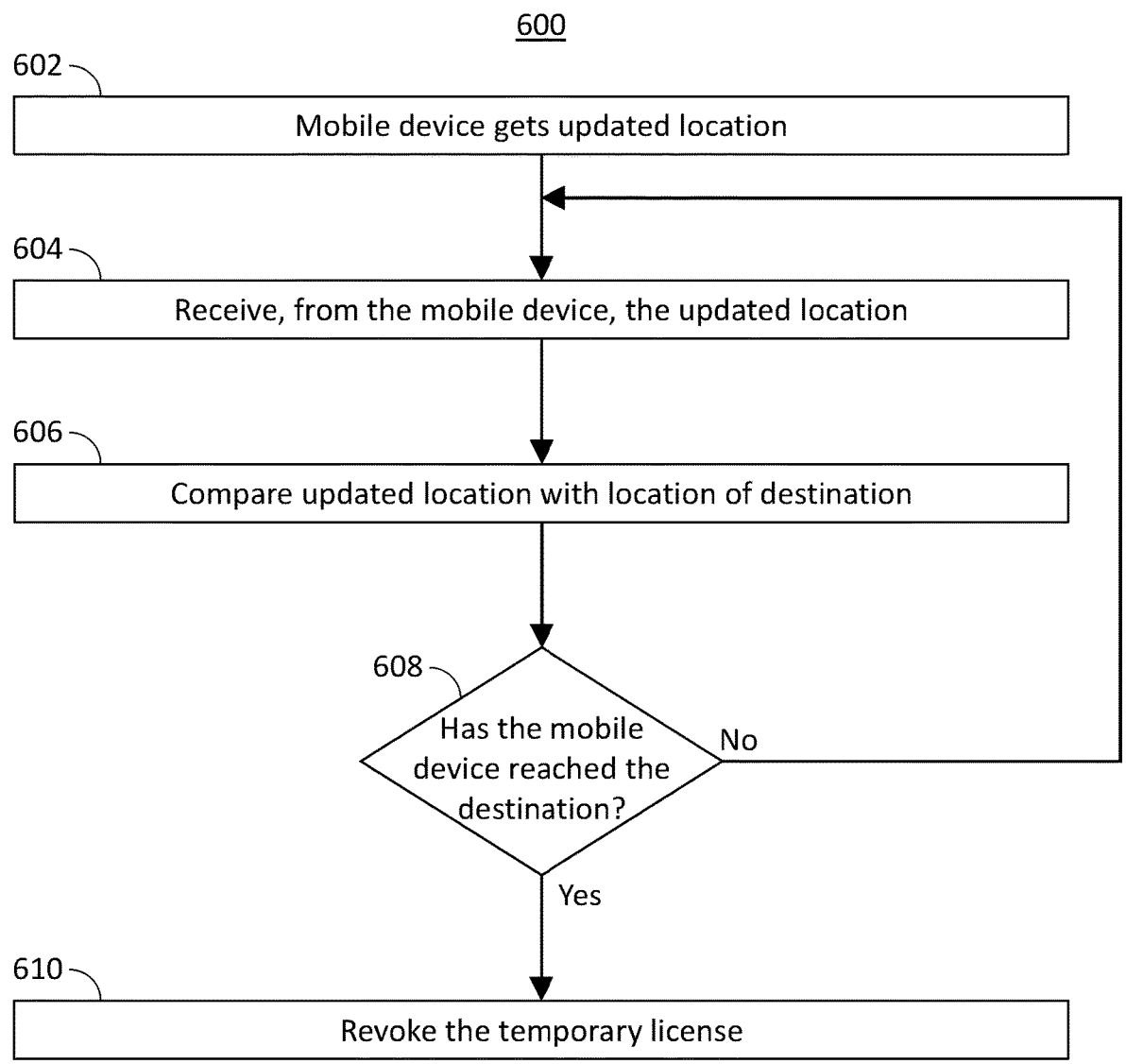
FIG. 6 is a flowchart representing a process for revoking a temporary license in accordance with some embodiments of the disclosure.

FIG. 6 is a flowchart representing a process for revoking a temporary license in accordance with some embodiments of the disclosure. The flowchart in FIG. 6 represents a process 600 implemented on mobile device control circuitry 200 and/or server control circuitry 202 for revoking a temporary license according to an embodiment of the disclosure. In addition, one or more actions of process 600 may be incorporated into or combined with one or more actions of any other process or embodiment described herein. Furthermore, process 600 may be performed exclusively on the mobile device 102, exclusively on the server 104, or be distributed between both mobile device 102 and server 104.

At 602, the mobile device control circuitry 200 obtains an updated location. This may be accomplished using any suitable method such as those for obtaining the current location of the mobile device 102 as described above in reference to FIG. 5.

At 604, the server control circuitry 202 receives, from the mobile device 102, the updated location. Location circuitry 204 may transfer the updated location information to mobile device communications circuitry 208, which may in turn transmit the updated location information to server 104. Server communications circuitry 220 receives the updated location information from mobile device communications circuitry 208.

At 606, the server control circuitry 202 compares the updated location with the destination 110. Server control circuitry 202 may employ any suitable type of comparison. For example, server control circuitry 202 may compare a string representing the current location with a string representing the destination 110. Alternatively, server control circuitry 202 may compare geographical coordinates representing the current locations (e.g., latitude and longitude) with those of the destination 110. Other types of comparisons are also possible.

At 608, the server control circuitry 202 determines whether the mobile device 102 has reached the destination 110. For example, server control circuitry 202 may determine that the result of the comparison performed at step 606 indicates that the current location of the mobile device 102 is the destination 110.

If the mobile device 102 has reached the destination 110, then, at 610, the server control circuitry 202 revokes the temporary license. For example, licensing circuitry 224 may update license database 228 to remove any entries identifying the content that are associated with the mobile device 102.

It is contemplated that the actions or descriptions of FIG. 6 may be used with any other embodiment of this disclosure. In addition, the actions and descriptions described in relation to FIG. 6 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process.

Figure 7:
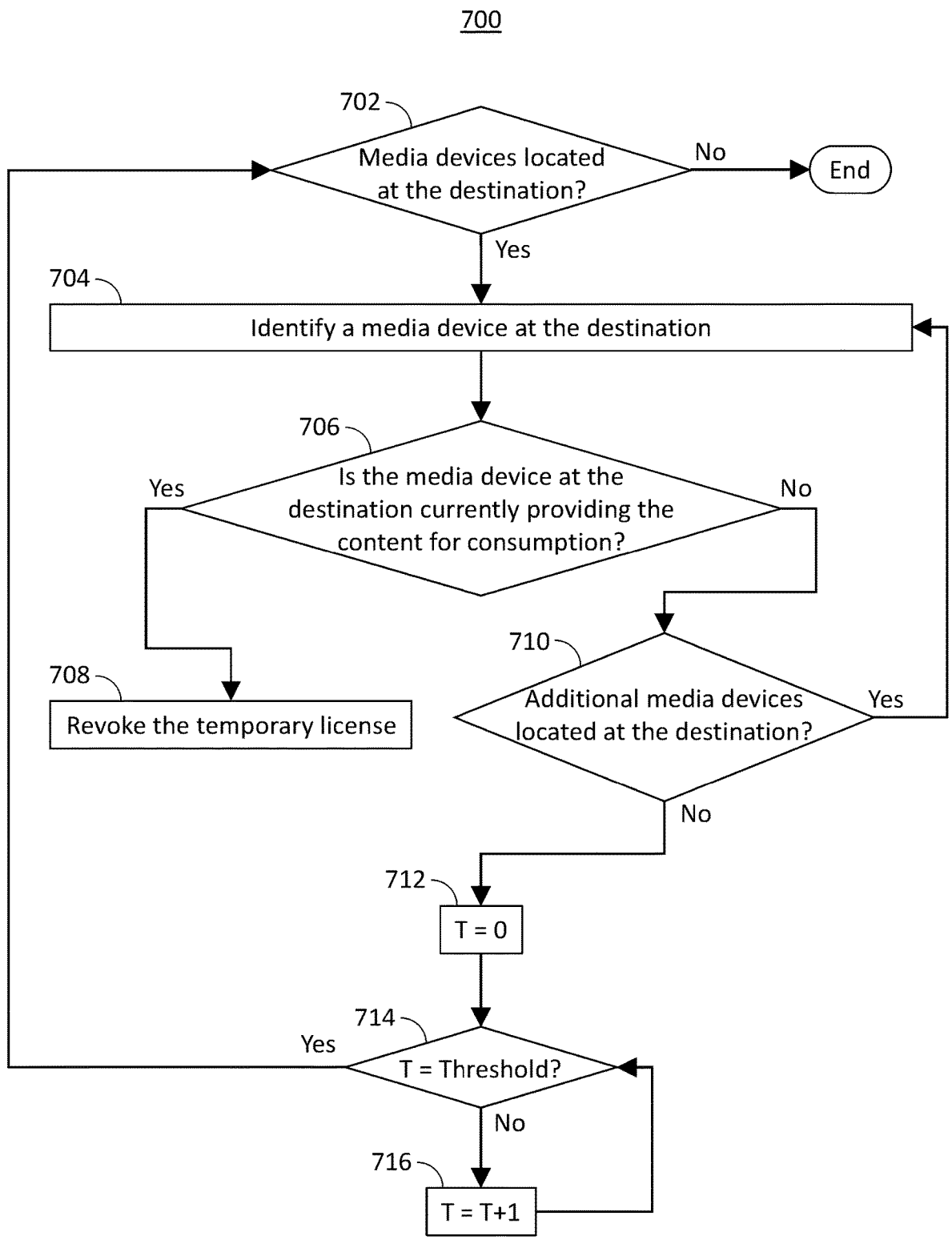
FIG. 7 is a flowchart representing another process for revoking a temporary license in accordance with some embodiments of the disclosure.

FIG. 7 is a flowchart representing another process for revoking a temporary license in accordance with some embodiments of the disclosure. The flowchart in FIG. 7 represents another process 700 implemented on mobile device control circuitry 200 and/or server control circuitry 202 for revoking a temporary license according to an embodiment of the disclosure. In addition, one or more actions of process 700 may be incorporated into or combined with one or more actions of any other process or embodiment described herein. Furthermore, process 700 may be performed exclusively on the mobile device 102, exclusively on the server 104, or be distributed between both mobile device 102 and server 104.

In some embodiments, after determining that the mobile device 102 has reached the destination 110, the server control circuitry 202 determines, at 702, whether there are any media devices present at the destination 110. For example, server communications circuitry 220 may access a database of media devices registered to the destination location 110. Alternatively, server communications circuitry 220 may poll a network device at the destination 110 for an indication of any media devices present on the network.

If at least one media device is present at the destination 110, then for each media device present at the destination 110, the server control circuitry 202, at 704, identifies each media device. For example, server communications circuitry 220 may request, retrieve, or otherwise access a unique identifier of each media device present at the destination 110, such as a serial number, network address, physical address, MAC address, or the like.

At 706, the server control circuitry 202 determines whether the content is currently being consumed on the identified media device at the destination 110. For example, server communications circuitry 220 queries the identified media device to determine a content identifier of content currently being consumed on the identified media device. Alternatively, server communications circuitry 220 may query the identified media device to determine a content provider from which the identified media device is currently receiving content. The server control circuitry 202 may then query a content database to determine content currently being provided by the identified content provider. Server control circuitry 202 compares an identifier of the content being consumed on the identified media device with the content identifier received from the mobile device 102 to determine if the content is currently being consumed on the identified media device.

If the content is currently being consumed on the identified media device at the destination 110, then, at 708, the server control circuitry 202 revokes the temporary license. For example, licensing circuitry 224 may update license database 228 to remove any entries identifying the content that are associated with the mobile device 102.

If the content is not currently being consumed on the identified media device at the destination 110, then, at 710, server control circuitry 202 determines if there are any other media devices at the destination 110. If so, processing returns to step 704, and server control circuitry 202 is configured to identify another media device at the destination 110.

If there are no additional media devices at the destination 110, then, at 712, server control circuitry 202 begins a timer and waits a threshold amount of time.

At 714, server control circuitry 202 determines whether the threshold amount of time has passed. If not, then, at 716, server control circuitry 202 continues waiting. If the threshold amount of time has passed, then processing returns to step 502, and server control circuitry 202 again determines whether any media devices are present at the destination 110.

It is contemplated that the actions or descriptions of FIG. 7 may be used with any other embodiment of this disclosure. In addition, the actions and descriptions described in relation to FIG. 7 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process.

Figure 8:
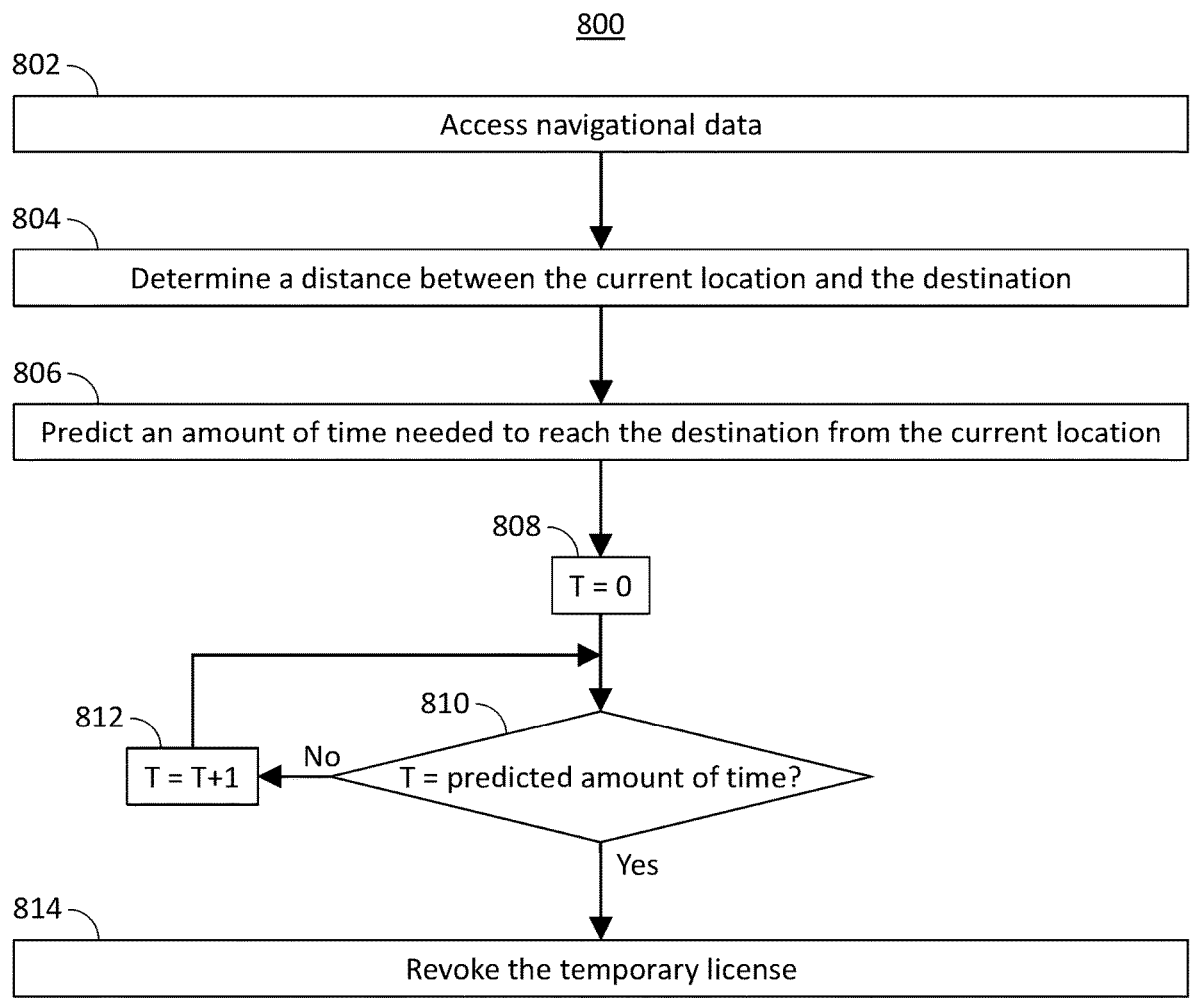
FIG. 8 is a flowchart representing a third process for revoking a temporary license in accordance with some embodiments of the disclosure.

FIG. 8 is a flowchart representing a third process for revoking a temporary license in accordance with some embodiments of the disclosure. The flowchart in FIG. 8 represents a third process 800 implemented on mobile device control circuitry 200 and/or server control circuitry 202 for revoking a temporary license according to an embodiment of the disclosure. In addition, one or more actions of process 800 may be incorporated into or combined with one or more actions of any other process or embodiment described herein. Furthermore, process 800 may be performed exclusively on the mobile device 102, exclusively on the server 104, or be distributed between both mobile device 102 and server 104.

At 802, server control circuitry 202 accesses navigational data. The navigational data may be stored locally on the server 104, or retrieved from another server or service, such as Google Maps. The navigational data includes all data necessary to compute a route between the first location 100 and the destination 110, such as maps, speed limits, lengths of each road segment represented on the maps, locations of traffic control signs and signals, and the like.

At 804, server control circuitry 202 determines a distance between the first location 100 and the destination 110. For example, the server control circuitry 202 determines a route between the first location 100 and the destination 110 and adds together the lengths of each road segment traversed by the determined route.

At 806, server control circuitry 202 calculates an amount of time needed to reach the destination 110 from the first location 100 based on the navigational data. For example, server control circuitry 202 applies known speed limits to each road segment traversed by the determined route and divides the length of each road segment by its respective speed limit to calculate an amount of time needed to traverse the road segment. The time needed for all road segments is then added together to determine an amount of time needed to traverse the entire route. Server control circuitry 202 may also account for traffic control signs (e.g., stop signs) and signals (e.g., traffic lights) by adding a fixed amount of time for each type of traffic control sign and signal.

At 808, server control circuitry 202 begins a timer. For example, server control circuitry 202 may initiate a timer thread to count the amount of time elapsed from the time the mobile device 102 leaves the first location 100. The time thread may increment the value of a variable every timer period. The timer period may be set in minutes, seconds, milliseconds, or any other suitable amount of time.

At 810, server control circuitry 202 determines whether the calculated amount of time has passed. For example, server control circuitry 202 compares the value of the variable incremented by the timer with the amount of time determined to be needed to traverse the route. Server control circuitry 202 may multiply the value of the variable by the period of the timer to determine an amount of time represented by the variable. Alternatively, server control circuitry 202 may convert the determined amount of time needed to traverse the route to the same time units as the timer period. Server control circuitry 202 may then perform a simple arithmetic comparison between the value of the variable and the needed amount of time.

If the calculated amount of time has not yet passed, then, at 812, server control circuitry 202 increments the timer. If the calculated amount of time has passed, then, at 814, server control circuitry 202 revokes the temporary license. For example, licensing circuitry 224 may update license database 228 to remove any entries identifying the content that are associated with the mobile device 102.

It is contemplated that the actions or descriptions of FIG. 8 may be used with any other embodiment of this disclosure. In addition, the actions and descriptions described in relation to FIG. 8 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process.

Figure 9:
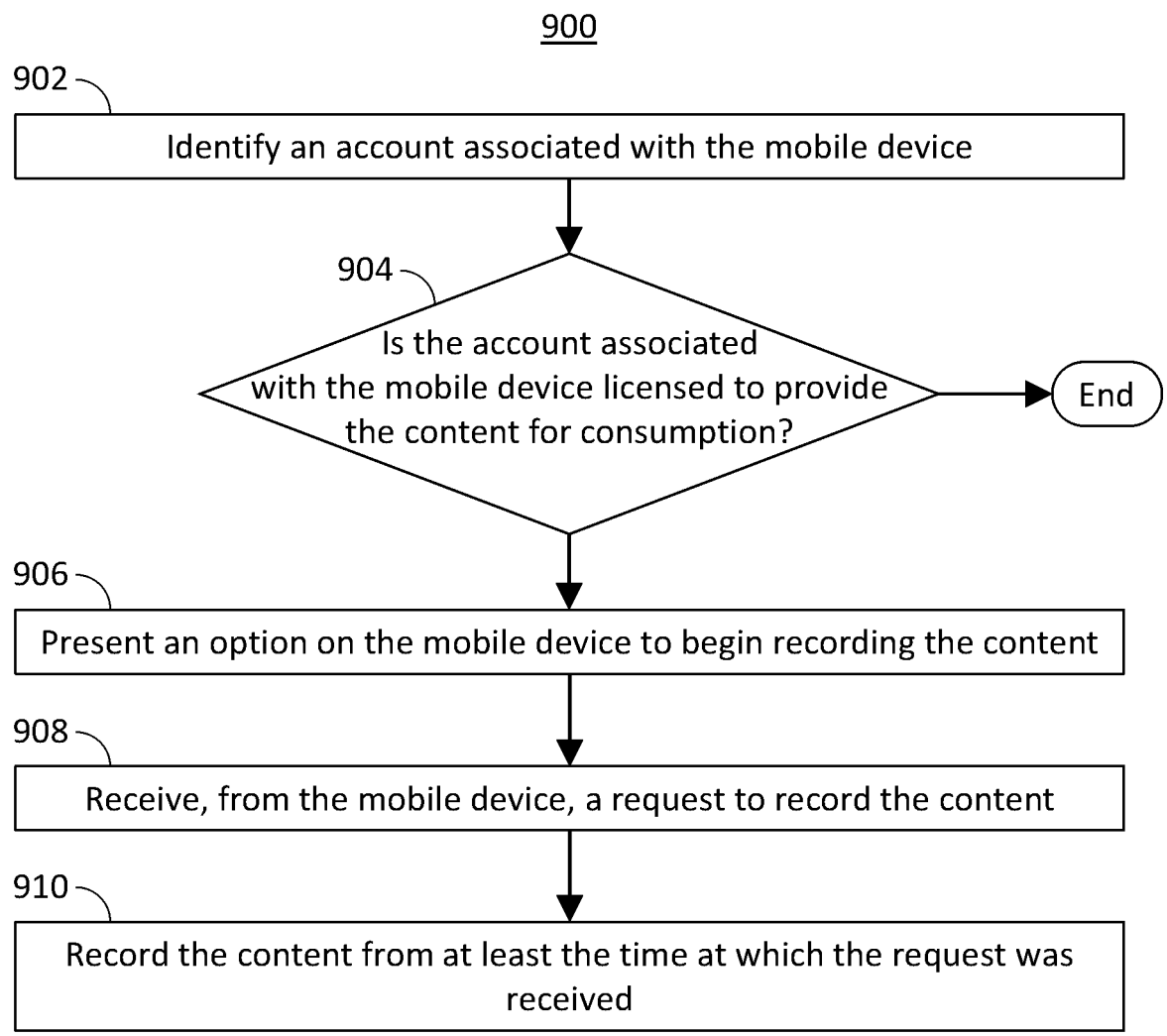
FIG. 9 is a flowchart representing a process for recording temporarily licensed content in accordance with some embodiments of the disclosure.

FIG. 9 is a flowchart representing a process for recording temporarily licensed content in accordance with some embodiments of the disclosure. The flowchart in FIG. 9 represents a process 900 implemented on mobile device control circuitry 200 and/or server control circuitry 202 for recording temporarily licensed content according to an embodiment of the disclosure. In addition, one or more actions of process 900 may be incorporated into or combined with one or more actions of any other process or embodiment described herein. Furthermore, process 900 may be performed exclusively on the mobile device 102, exclusively on the server 104, or be distributed between both mobile device 102 and server 104.

At 902, server control circuitry 202 identifies an account associated with the mobile device 102. For example, mobile device control circuitry 200 may include, in its transmission of information to server 104, an identifier of the mobile device. Server control circuitry 202 may query a database of accounts and associated devices for the received identifier of the mobile device. Alternatively, the mobile device control circuitry 200 may transmit an account identifier.

At 904, server control circuitry 202 determines whether the account associated with the mobile device 102 is licensed to consume the content. For example, licensing circuitry 224 may query license database 228 for entries associated with the content and containing an identifier of the account associated with the mobile device 102.

If the mobile device 102 is licensed to consume the content, then, at 906, server control circuitry 202 presents an option on the mobile device to begin recording the content. For example, server communications circuitry 220 may transmit a push notification or other message to the mobile device 102 offering options to record the content to the user's DVR or other media recording device.

At 908, server control circuitry 202 receives, from mobile device 102, a request to record the content. For example, in response to the option presented on the mobile device 102 to begin recording the content, the user of the mobile device 102 may select to record the content. Mobile device communications circuitry 208 may transmit the request to record the content to server 104, where it is received by server communications circuitry 220.

At 910, in response to receiving the request to record the content, server control circuitry 202 records the content from at least the time the request was received. For example, server 104 buffers the content from at least the time at which the request was received and stores the buffered content in a memory of the server, or a cloud storage system. Alternatively, the server instructs a DVR or other media recording device associated with the user's account to begin recording the content.

It is contemplated that the actions or descriptions of FIG. 9 may be used with any other embodiment of this disclosure. In addition, the actions and descriptions described in relation to FIG. 9 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process.

Figure 10:
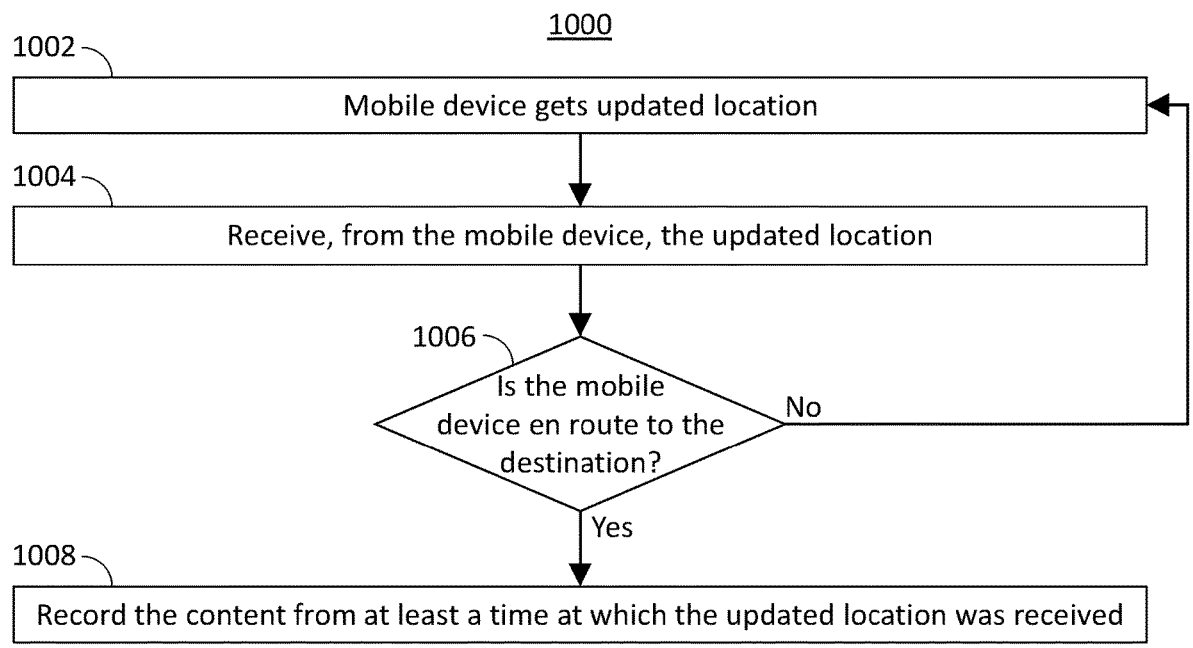
FIG. 10 is a flowchart representing another process for recording temporarily licensed content in accordance with some embodiments of the disclosure.

FIG. 10 is a flowchart representing another process for recording temporarily licensed content in accordance with some embodiments of the disclosure. The flowchart in FIG. 10 represents another process 1000 implemented on mobile device control circuitry 200 and/or server control circuitry 202 for recording temporarily licensed content according to an embodiment of the disclosure. In addition, one or more actions of process 1000 may be incorporated into or combined with one or more actions of any other process or embodiment described herein. Furthermore, process 1000 may be performed exclusively on the mobile device 102, exclusively on the server 104, or be distributed between both mobile device 102 and server 104.

At 1002, mobile device control circuitry 200 obtains an updated location, which may be performed using any of the methods described above in reference to FIG. 5.

At 1004, server control circuitry 202 receives, from the mobile device 102, the updated location, which may be performed using methods described above in reference to FIG. 6.

At 1006, server control circuitry 202 determines whether the mobile device 102 is en route to the destination 110. For example, server 104 compares the updated location of the mobile device 102 with the first location 100 and the destination location 110 and determines that the mobile device 102 is located in an area between the first location 100 and the destination location 110. Server 104 may compare geographic coordinates, addresses, or any other location data of the current location with corresponding data of the first location 100 and the destination location 110 to determine whether the mobile device 102 is en route to the destination 110.

If the mobile device 102 is en route to the destination 110, then, at 1008, server control circuitry 202 records the content from at least a time at which the updated location was received. This may be accomplished using methods described above in reference to FIG. 9.

It is contemplated that the actions or descriptions of FIG. 10 may be used with any other embodiment of this disclosure. In addition, the actions and descriptions described in relation to FIG. 10 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process.

Figure 11:
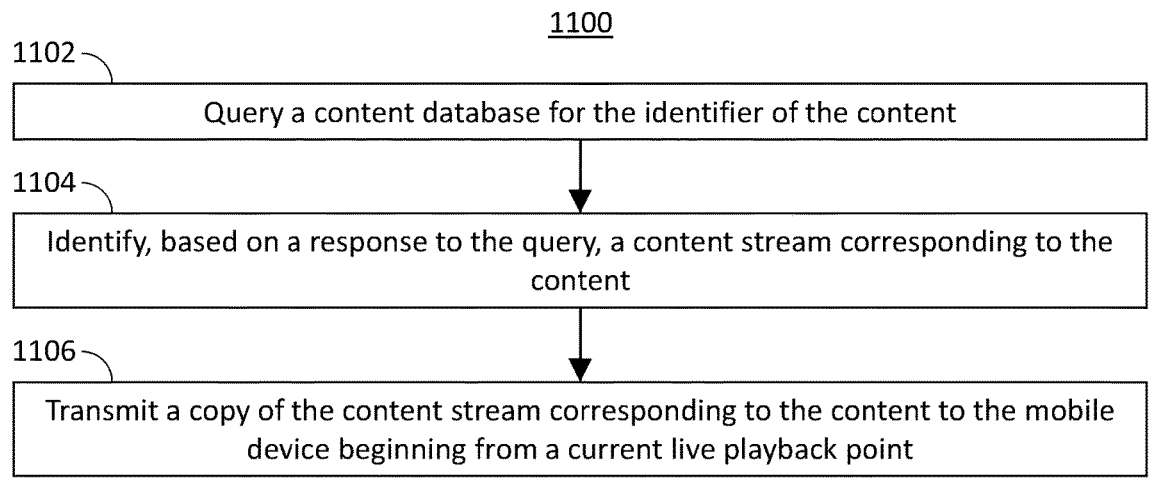
FIG. 11 is a flowchart representing a process for providing temporarily licensed content to a mobile device for consumption in accordance with some embodiments of the disclosure.

FIG. 11 is a flowchart representing a process for providing temporarily licensed content to a mobile device for consumption in accordance with some embodiments of the disclosure. The flowchart in FIG. 11 represents a process 1100 implemented on mobile device control circuitry 200 and/or server control circuitry 202 for providing temporarily licensed content to a mobile device for consumption according to an embodiment of the disclosure. In addition, one or more actions of process 1100 may be incorporated into or combined with one or more actions of any other process or embodiment described herein. Furthermore, process 1100 may be performed exclusively on the mobile device 102, exclusively on the server 104, or be distributed between both mobile device 102 and server 104.

At 1102, server control circuitry 202 queries a content database for the identifier of the content. For example, server control circuitry 202 may query a media source database, which may be stored locally on server 104 or at a remote server, for entries containing an identifier of the content.

At 1104, server control circuitry 202 identifies, based on a response to the query, a content stream corresponding to the content. For example, the media source database includes identifiers for the source of each content item. The source may be a URL or other resource locator, or may refer to a particular program identifier within a physical RF channel.

At 1106, server control circuitry 202 transmits a copy of the content stream corresponding to the content to the mobile device 102 beginning from a current live playback point. For example, the server communications circuitry 220 may access the URL of the stream and relay the streaming data in real time or near-real time to the mobile device 102. If the source refers to a physical channel, server control circuitry 202 may access the identified physical channel and buffer the content for transmission to the mobile device 102.

It is contemplated that the actions or descriptions of FIG. 11 may be used with any other embodiment of this disclosure. In addition, the actions and descriptions described in relation to FIG. 11 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process.

Figure 12:
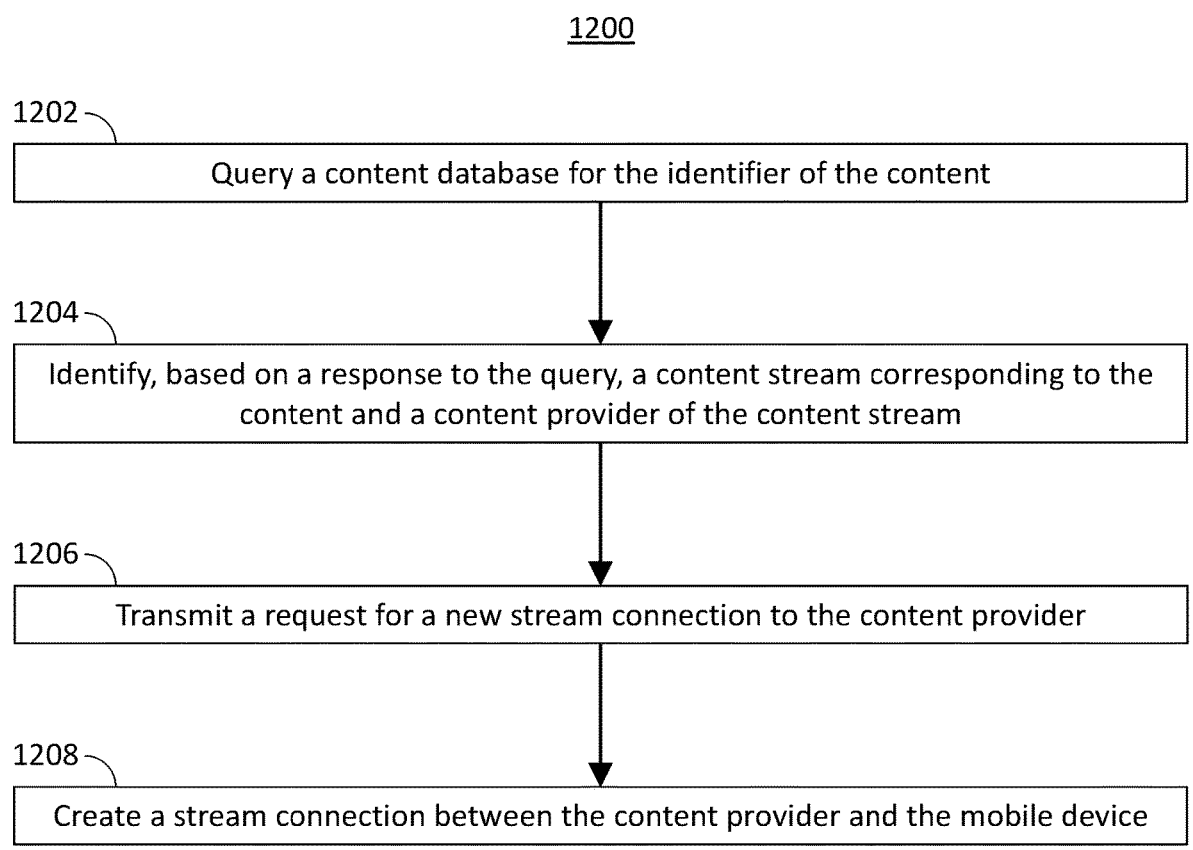
FIG. 12 is a flowchart representing another process for providing temporarily licensed content to a mobile device for consumption in accordance with some embodiments of the disclosure.

FIG. 12 is a flowchart representing another process for providing temporarily licensed content to a mobile device for consumption in accordance with some embodiments of the disclosure. The flowchart in FIG. 12 represents another process 1200 implemented on mobile device control circuitry 200 and/or server control circuitry 202 for providing temporarily licensed content to a mobile device for consumption according to an embodiment of the disclosure. In addition, one or more actions of process 1200 may be incorporated into or combined with one or more actions of any other process or embodiment described herein. Furthermore, process 1200 may be performed exclusively on the mobile device 102, exclusively on the server 104, or be distributed between both mobile device 102 and server 104.

At 1202, server control circuitry 202 queries a content database for the identifier of the content, which may be accomplished using methods as described above in reference to FIG. 11.

At 1204, server control circuitry 202 identifies, based on a response to the query, a content stream corresponding to the content and a content provider of the content stream. For example, the media source database includes identifiers for the source of each content item. The source may be a URL or other resource locator, or may refer to a particular program identifier within a physical RF channel. The content provider may be a service (e.g., Netflix), a television network (e.g., NBC), or a media company (e.g., NBCUniversal).

At 1206, server control circuitry 202 transmits a request for a new stream connection to the content provider. For example, server communications circuitry 220 transmits a request (e.g., an HTTP request) to a server of the content provider to begin streaming the content.

At 1208, server control circuitry 202 creates a stream connection between the content provider and the mobile device 102. For example, server communications circuitry 220 establishes a real-time data transmission connection (e.g., HLS, RTMP, Microsoft Smooth Streaming, MPEG-DASH, etc.) with mobile device 102. Server communications circuitry 220 bridges the requested stream connection from the content provider with the stream connection established with the mobile device 102 to create a direct connection between the content provider and the mobile device 102.

It is contemplated that the actions or descriptions of FIG. 12 may be used with any other embodiment of this disclosure. In addition, the actions and descriptions described in relation to FIG. 12 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process.

Figure 13:
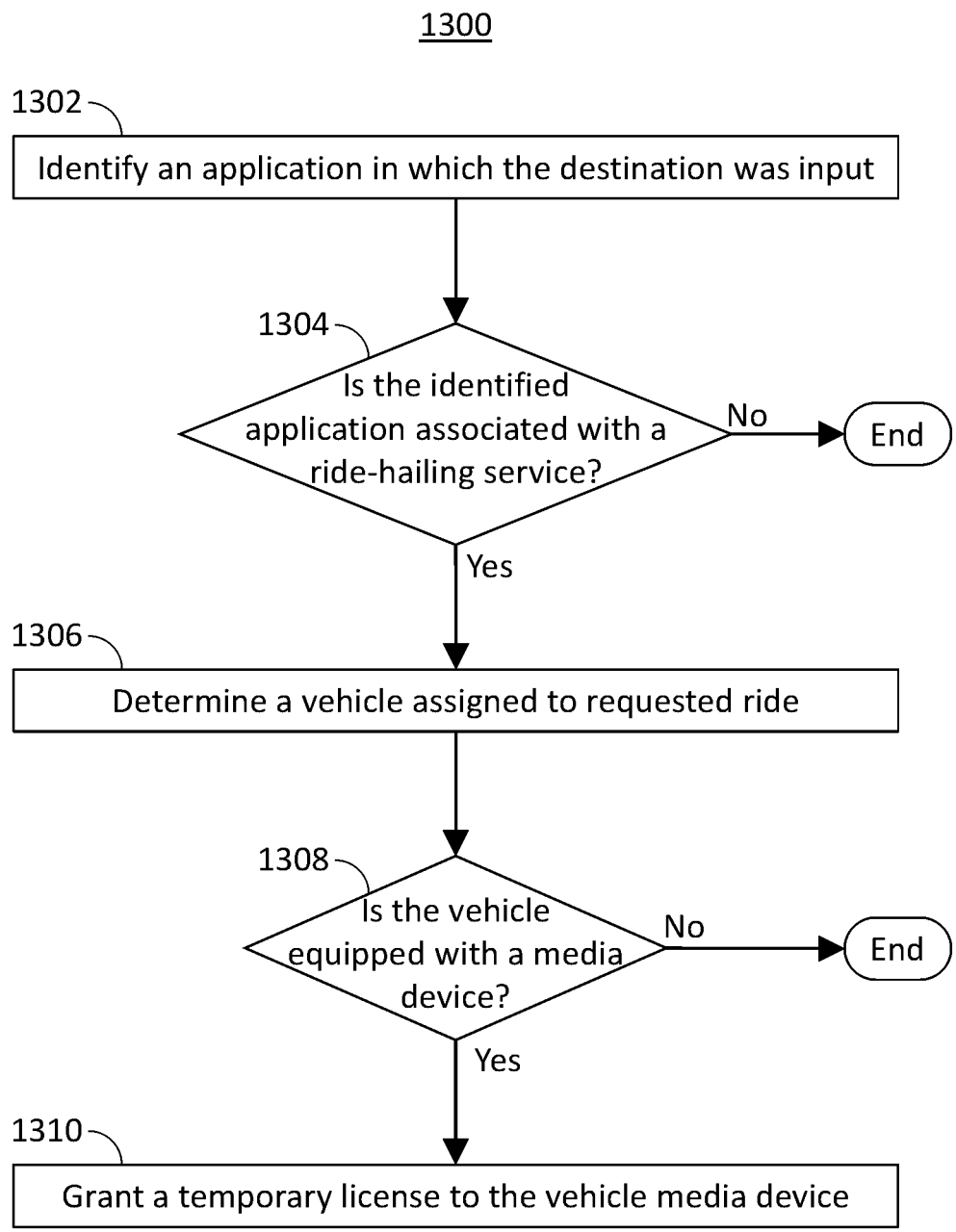
FIG. 13 is a flowchart representing a process for granting a temporary license to a media device in a vehicle of a ride-hailing service in accordance with some embodiments of the disclosure.

FIG. 13 is a flowchart representing a process for granting a temporary license to a media device in a vehicle of a ride-hailing service in accordance with some embodiments of the disclosure. The flowchart in FIG. 13 represents a process 1300 implemented on mobile device control circuitry 200 and/or server control circuitry 202 for granting a temporary license to a media device in a vehicle of a ride-hailing service according to an embodiment of the disclosure. In addition, one or more actions of process 1300 may be incorporated into or combined with one or more actions of any other process or embodiment described herein. Furthermore, process 1300 may be performed exclusively on the mobile device 102, exclusively on the server 104, or be distributed between both mobile device 102 and server 104.

At 1302, mobile device control circuitry 200 identifies an application in which the destination 110 was input. For example, mobile device control circuitry 200 monitors all applications currently running on mobile device 102, and tracks which application is currently focused. Upon receiving user input, user data I/O circuitry 212 determines the focused application and transfers an identifier of the focused application to mobile device communications circuitry 208 for transmission to server 104 along with destination 110.

At 1304, server control circuitry 202 determines whether the focused application is associated with a ride-hailing service. Server 104, using server communications circuitry 220, receives the identifier of the focused application. Server control circuitry 202 queries a database of applications to determine the type of application in which the destination 110 was input.

If server control circuitry 202 determines, based on a response to the query, that the application is of a type associated with a ride-hailing service (e.g., Uber), then, at 1306, server control circuitry 202 determines a specific vehicle assigned to transport the user to the destination 110. Server control circuitry 202 may identify a remote server or database associated with the ride-hailing service, and query the database for current or active ride assignments associated with the mobile device 102. In response to the query, server control circuitry 202 may receive an identifier of the assigned vehicle.

At 1308, server control circuitry 202 determines whether the assigned vehicle is equipped with a media device. Server control circuitry 202 may receive an indication of equipment available in the assigned vehicle in response to the query made at step 1306, or may query the same database or a different database associated with the ride-hailing service to determine whether the assigned vehicle is equipped with a media device.

If the assigned vehicle is equipped with a media device then, at 1310, server control circuitry 202 temporarily licenses the content to the media device of the assigned vehicle. This may be accomplished using methods described above for temporarily licensing content to mobile device 102 in reference to FIG. 5.

It is contemplated that the actions or descriptions of FIG. 13 may be used with any other embodiment of this disclosure. In addition, the actions and descriptions described in relation to FIG. 13 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process.

Figure 14:
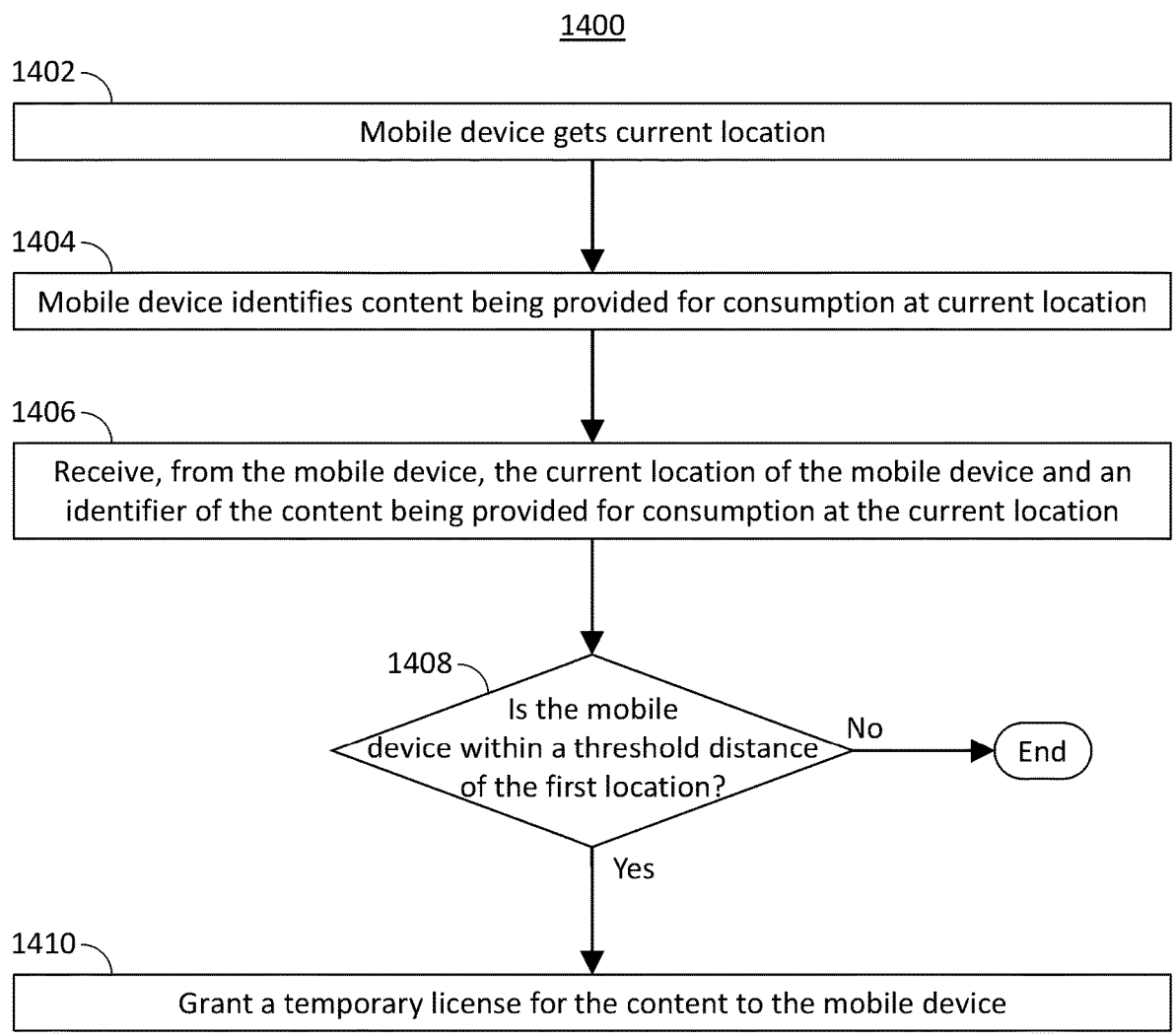
FIG. 14 is a flowchart representing another process for granting a temporary license to a mobile device in accordance with some embodiments of the disclosure.

FIG. 14 is a flowchart representing another process for granting a temporary license to a mobile device in accordance with some embodiments of the disclosure. The flowchart in FIG. 14 represents another process 1400 implemented on mobile device control circuitry 200 and/or server control circuitry 202 for granting a temporary license to a mobile device according to an embodiment of the disclosure. In addition, one or more actions of process 1400 may be incorporated into or combined with one or more actions of any other process or embodiment described herein. Furthermore, process 1400 may be performed exclusively on the mobile device 102, exclusively on the server 104, or be distributed between both mobile device 102 and server 104.

At 1402, mobile device control circuitry 200 obtains a current location. This may be accomplished using methods described above in reference to FIG. 5.

At 1404, mobile device control circuitry 200 identifies content being consumed on a media device at the current location. This may be accomplished using methods described above in reference to FIG. 5.

At 1406, server control circuitry 202 receives, from the mobile device 102, the current location of the mobile device 102 and an identifier of content being consumed on a media device at the current location. This may be accomplished using methods described above in reference to FIG. 5.

At 1408, server control circuitry 202 determines whether the mobile device 102 is within a threshold distance of the first location 100. The threshold distance may be a radial distance from the first location, such as 50 feet. For example, server control circuitry 202 compares the updated location with the first location 100. Server control circuitry 202 may employ any suitable type of comparison as described above in reference to FIG. 6. Server control circuitry may calculate a difference between a central point or any or all edges of the first location 100 and the current location to determine whether the mobile device 102 is within the 50-foot radius of the first location 100.

If the mobile device 102 is within the threshold distance of the first location 100, then, at 1410, server control circuitry 202 grants a temporary license for the content to the mobile device 102. This may be accomplished using methods described above in reference to FIG. 5.

It is contemplated that the actions or descriptions of FIG. 14 may be used with any other embodiment of this disclosure. In addition, the actions and descriptions described in relation to FIG. 14 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process.

Figure 15:
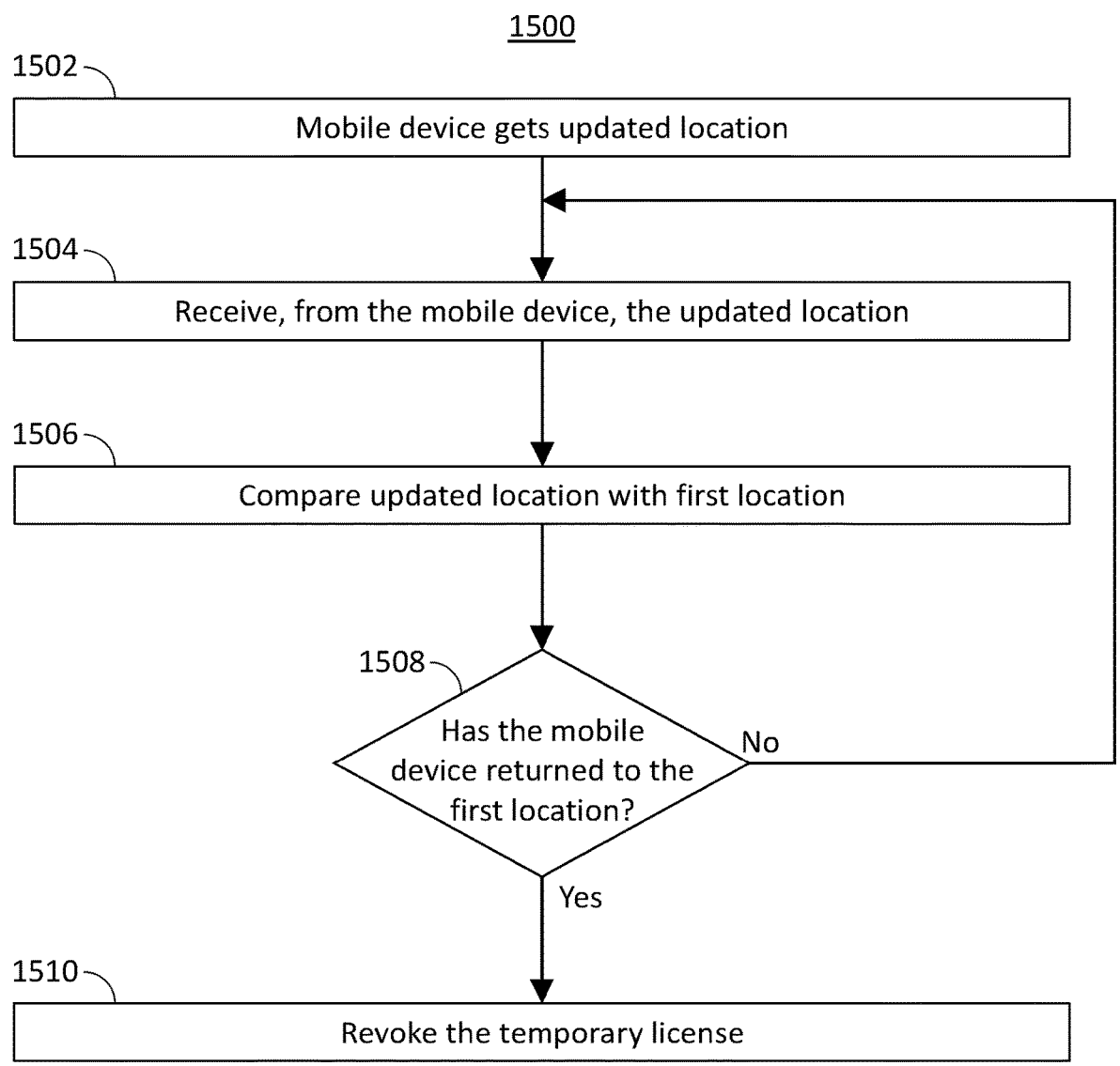
FIG. 15 is a flowchart representing a fourth process for revoking a temporary license in accordance with some embodiments of the disclosure.

FIG. 15 is a flowchart representing a fourth process for revoking a temporary license in accordance with some embodiments of the disclosure. The flowchart in FIG. 15 represents a process 1500 implemented on mobile device control circuitry 200 and/or server control circuitry 202 for revoking a temporary license according to an embodiment of the disclosure. In addition, one or more actions of process 1500 may be incorporated into or combined with one or more actions of any other process or embodiment described herein. Furthermore, process 1500 may be performed exclusively on the mobile device 102, exclusively on the server 104, or be distributed between both mobile device 102 and server 104.

At 1502, the mobile device 102 obtains an updated location. This may be accomplished using methods described above in reference to FIG. 5.

At 1504, server control circuitry 202 receives, from the mobile device 102, the updated location. This may be accomplished using methods described above in reference to FIG. 6.

At 1506, server control circuitry 202 compares the updated location with the first location 100. This may be accomplished using methods descried above in reference to FIG. 14 for determining whether the mobile device 102 is within the threshold distance of the first location 100.

At 1508, server control circuitry 202 determines, based on the comparison made at step 1506, whether the mobile device 102 has returned to the first location 100. This may be accomplished using methods described above in reference to FIG. 14 for determining whether the mobile device 102 is within the threshold distance of the first location 100, or methods described above in reference to FIG. 6 for determining whether the mobile device 102 has reached the destination 110.

If the mobile device 102 has returned to the first location 110, then, at 1510, server control circuitry 202 revokes the temporary license. This may be accomplished using methods described above in reference to FIG. 6.

It is contemplated that the actions or descriptions of FIG. 15 may be used with any other embodiment of this disclosure. In addition, the actions and descriptions described in relation to FIG. 15 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for providing content for consumption on a mobile device, the method comprising:
   receiving, from a mobile device, a current location of the mobile device, and an identifier of content being provided for consumption at the current location;
   receiving, from the mobile device, a location of a destination of the mobile device;
   determining whether the content is licensed for consumption at the destination; and
   in response to determining that the content is licensed for consumption at the destination, granting a temporary license for the content to the mobile device.

2. The method of claim 1, wherein receiving, from the mobile device, the location of a destination comprises receiving, from the mobile device, one of an input destination from a ride-hailing application, a location of an event from a calendar, and an input destination from a navigation application.

3. The method of claim 1, further comprising:
   receiving, from the mobile device, an updated location of the mobile device;
   determining, based on the updated location, whether the mobile device has reached the destination; and
   in response to determining that the mobile device has reached the destination, revoking the temporary license.

4. The method of claim 1, further comprising:
   receiving, from the mobile device, an updated location of the mobile device;
   determining, based on the updated location, whether the mobile device has reached the destination;
   in response to determining that the mobile device has reached the destination, determining whether a media device at the destination is currently providing the content for consumption;
   in response to determining that the media device at the destination is currently providing the content for consumption, revoking the temporary license; and
   in response to determining that the media device at the destination is not currently providing the content for consumption:
      periodically determining whether the media device at the destination is providing the content for consumption; and
      in response to determining that the media device at the destination is providing the content for consumption, revoking the temporary license.

5. The method of claim 1, further comprising:
   predicting an amount of time needed to reach the destination from the current location;
   determining whether the predicted amount of time has passed; and
   in response to determining that the predicted amount of time has passed, revoking the temporary license.

6. The method of claim 1, further comprising:
   determining whether an account associated with the mobile device is licensed to provide the content for consumption; and
   in response to determining that the account associated with the mobile device is licensed to provide the content for consumption, presenting an option on the mobile device to begin recording the content.

7. The method of claim 6, further comprising:
   receiving, from the mobile device, a request to record the content; and
   in response to receiving the request, recording the content from at least a time at which the request was received.

8. The method of claim 6, further comprising:
   receiving an updated location from the media device;
   determining, based on the updated location, that the mobile device is en route to the destination; and
   in response to determining that the mobile device is en route to the destination, recording the content from at least a time at which the updated location was received.

9. The method of claim 1, further comprising:
   identifying a content stream corresponding to the content; and
   transmitting a copy of the content stream corresponding to the content to the mobile device beginning from a current live playback point.

10. The method of claim 9, further comprising:
    identifying a content provider of the content stream;
    transmitting a request for a new stream connection to the content provider; and
    creating a stream connection between the content provider and the mobile device.

11. A system for providing content for consumption on a mobile device, the system comprising:
    a mobile device comprising first control first circuitry configured to:
       determine an identifier of content being provided at a current location of the mobile device; and
       transmit, to a server, the current location of the mobile device, the identifier of the content being provided for consumption at the current location, and a location of a destination of the mobile device; and
    the server comprising second control circuitry configured to:

receive, from the mobile device, the current location of the mobile device, the identifier of the content being provided for consumption at the current location, and the location of the destination of the mobile device;

determine whether the content is licensed for consumption at the destination; and in response to determining that the content is licensed for consumption at the destination, grant a temporary license for the content to the mobile device.

12. The system of claim 11, wherein the second control circuitry, configured to receive, from the mobile device, the location of the destination, is further configured to receive, from the mobile device, one of an input destination from a ride-hailing application, a location of an event from a calendar, and an input destination from a navigation application.

13. The system of claim 11, wherein the second control circuitry is further configured to:

receive, from the mobile device, an updated location of the mobile device;

determine, based on the updated location, whether the mobile device has reached the destination; and in response to determining that the mobile device has reached the destination, revoke the temporary license.

14. The system of claim 11, wherein the second control circuitry is further configured to:

receive, from the mobile device, an updated location of the mobile device;

determine, based on the updated location, whether the mobile device has reached the destination;

in response to determining that the mobile device has reached the destination, determine whether a media device at the destination is currently providing the content for consumption;

in response to determining that the media device at the destination is currently providing the content for consumption, revoke the temporary license; and in response to determining that the media device at the destination is not currently providing the content for consumption:

periodically determining whether the media device at the destination is providing the content for consumption; and in response to determining that the media device at the destination is providing the content for consumption, revoke the temporary license.

15. The system of claim 11, wherein the second control circuitry is further configured to:

predict an amount of time needed to reach the destination from the current location;

determine whether the predicted amount of time has passed; and in response to determining that the predicted amount of time has passed, revoke the temporary license.

16. The system of claim 11, wherein the second control circuitry is further configured to:

determine whether an account associated with the mobile device is licensed to provide the content for consumption; and in response to determining that the account associated with the mobile device is licensed to provide the content for consumption, present an option on the mobile device to begin recording the content.

17. The system of claim 16, wherein the second control circuitry is further configured to:

receive from the mobile device, a request to record the content; and in response to receiving the request, record the content from at least a time at which the request was received.

18. The system of claim 16, wherein the second control circuitry is further configured to:

receive an updated location from the media device;

determine, based on the updated location, that the mobile device is en route to the destination; and in response to determining that the mobile device is en route to the destination, record the content from at least a time at which the updated location was received.

19. The system of claim 11, wherein the second control circuitry is further configured to:

identify a content stream corresponding to the content; and transmit a copy of the content stream corresponding to the content to the mobile device beginning from a current live playback point.

20. The system of claim 19, wherein the second control circuitry is further configured to:

identify a content provider of the content stream;

transmit a request for a new stream connection to the content provider; and create a stream connection between the content provider and the mobile device.

* * * * *